Dec. 15, 1931.  W. E. LIPPERT  1,836,477
CASH REGISTER
Filed May 29, 1925  10 Sheets-Sheet 1

WITNESS-
Albert S. Noyes

Inventor
Walter E. Lippert
By A. A. Hicks
H. C. Diserud
Attorneys

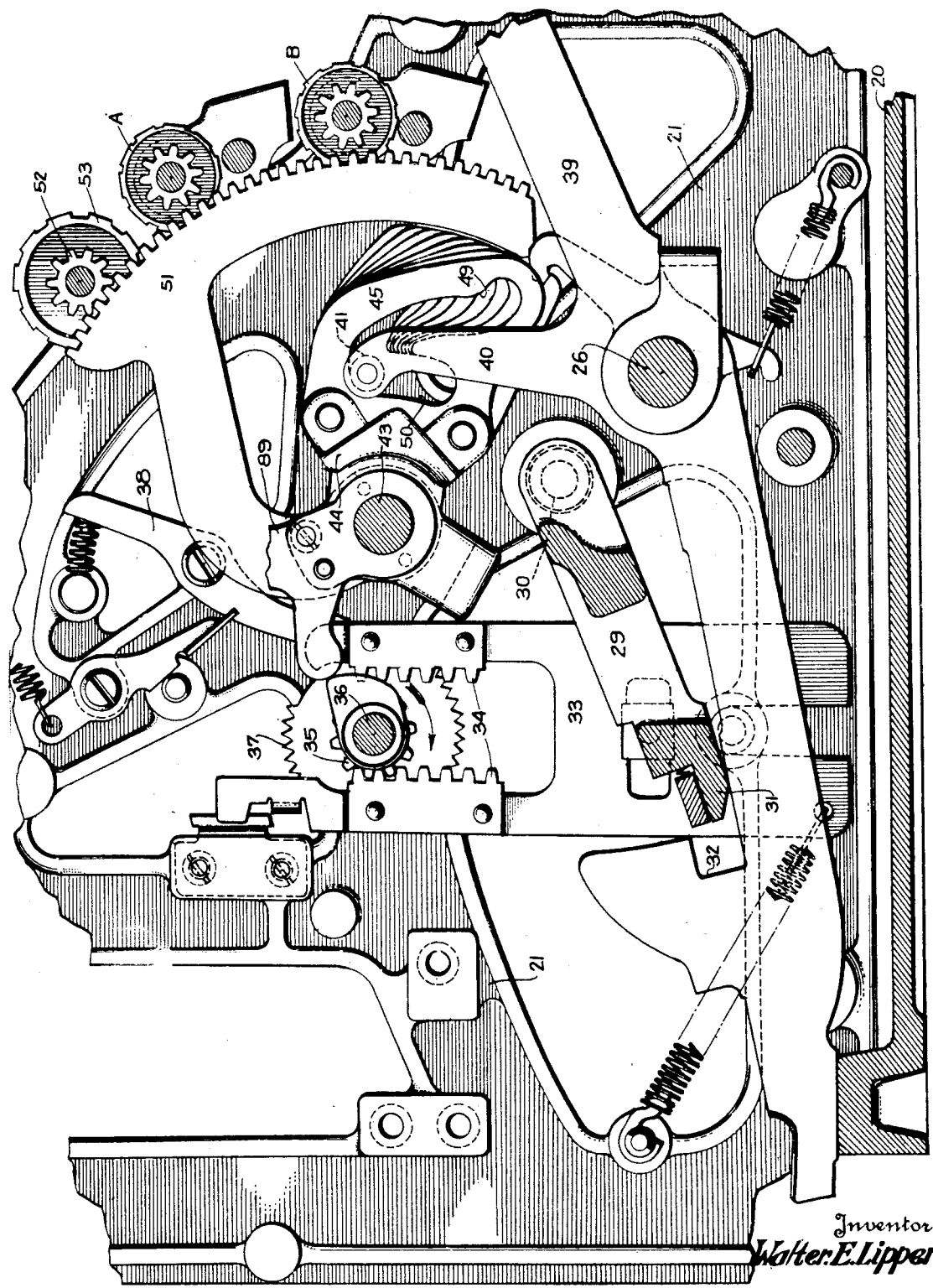

Dec. 15, 1931.  W. E. LIPPERT  1,836,477
CASH REGISTER
Filed May 29, 1925  10 Sheets-Sheet 5

INVENTOR.
Walter E. Lippert
BY
ATTORNEYS.

Dec. 15, 1931.  W. E. LIPPERT  1,836,477

CASH REGISTER

Filed May 29, 1925  10 Sheets-Sheet 7

WITNESS.
Albert S. Hayes.

INVENTOR.
Walter E. Lippert.

By
Attorneys

Dec. 15, 1931.  W. E. LIPPERT  1,836,477
CASH REGISTER
Filed May 29, 1925   10 Sheets-Sheet 8

Inventor
Walter E. Lippert.
By A. A. Wicks
H. C. Diserud
Attorneys

Dec. 15, 1931. W. E. LIPPERT 1,836,477
CASH REGISTER
Filed May 29, 1925 10 Sheets-Sheet 9
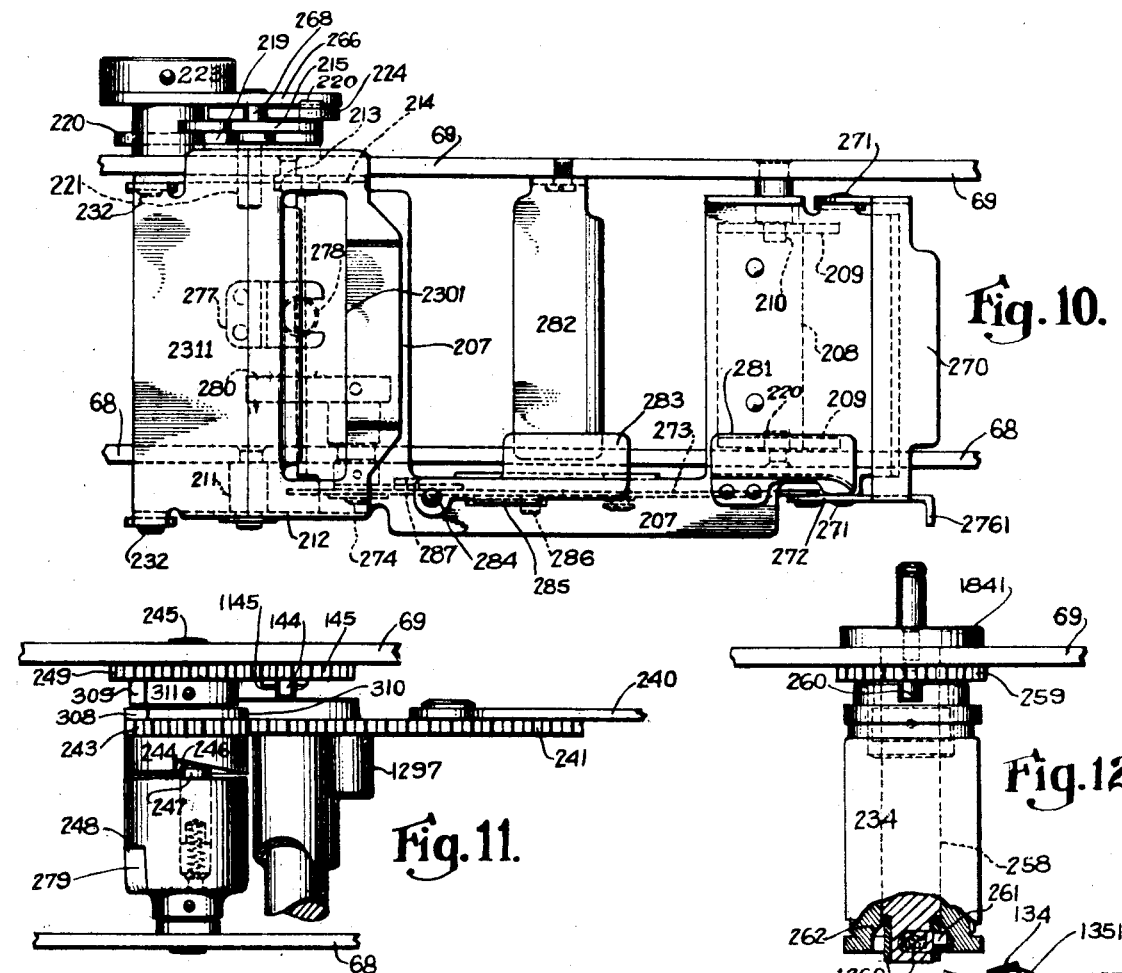
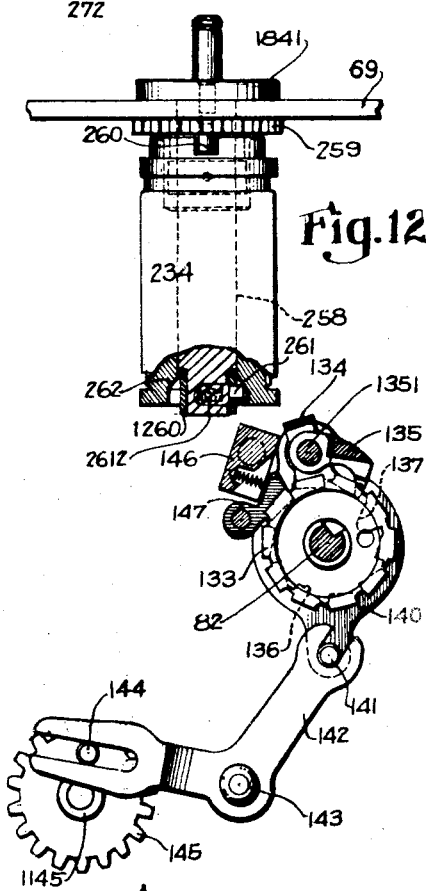
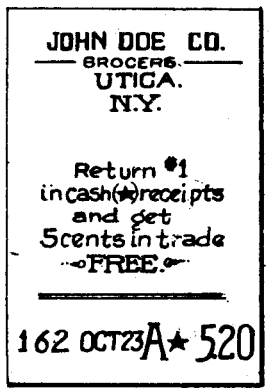
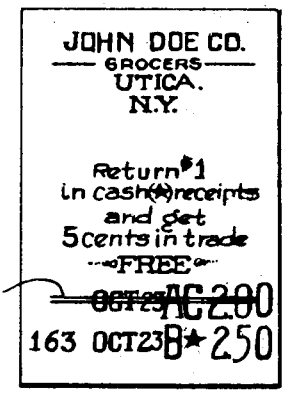
Inventor
Walter E. Lippert.

Dec. 15, 1931.  W. E. LIPPERT  1,836,477
CASH REGISTER
Filed May 29, 1925   10 Sheets-Sheet 10

Inventor
Walter E Lippert
By
Attorneys

Patented Dec. 15, 1931

1,836,477

UNITED STATES PATENT OFFICE

WALTER E. LIPPERT, OF JACKSON HEIGHTS, NEW YORK, ASSIGNOR TO REMINGTON ARMS COMPANY, INC., A CORPORATION OF DELAWARE

CASH REGISTER

Application filed May 29, 1925. Serial No. 33,735.

This invention relates generally to improvements in cash registers and has particular reference to improvements in the printing mechanisms of such machines.

In the accompanying drawings the improvements are shown applied to a machine of the same general type as is shown and described in U. S. application Ser. No. 263,125, filed November 19, 1918, by Frederick L. Fuller and British Patent Nos. 135,465, 140,363, 157,823, 157,824 and 157,825 of July 11, 1921. As will be more clearly apparent later on, however, the improvements are capable of being applied to or embodied in a number of other forms of cash registers and accounting machines without departing from the spirit of the invention.

The broad object of the invention is to provide a printing mechanism for printing and issuing checks or printing upon sales slips inserted to receive impressions preferably with controlling devices whereby the mechanism may be conditioned and used for either check printing or sales slip printing or discontinued at will.

Another object of the invention is to provide interlocking devices effective to insure correct operation of the improved machine as a whole when the printing mechanism is adapted to print upon issued checks, and associated controlling devices by means of which the interlocking devices may be retained in ineffective position when a special key is operated to print upon an inserted sales slip. A controlling device in the form of an adjustable lever is provided for disabling the interlocking mechanism when it is desired for some reason to be able to operate certain parts of the machine without either printing and issuing a check or printing upon a sales slip.

In the present preferred embodiment the printing mechanism comprises devices for printing certain data including devices for printing the serial or consecutive numbers upon the checks, and mechanism whereby changing the printing mechanism to a sales slip printing condition will prevent actuation of or printing from the consecutive numbering device. A provision of suitable mechanisms for so controlling the consecutive numbering device when a special key is operated to print upon an inserted slip is still another object of the invention.

With the foregoing and other objects in view the invention consists of a novel combination and arrangement of parts, the features of novelty of which are pointed out in the appended claims and a preferred embodiment of which is shown in the accompanying drawings.

Of said drawings:

Fig. 1—A is a perspective view of one of the improved cash registers showing the arrangement of the keyboard the slot wherein the sales slips are inserted and the controlling device for the check and slip printing mechanism.

Figure 4:
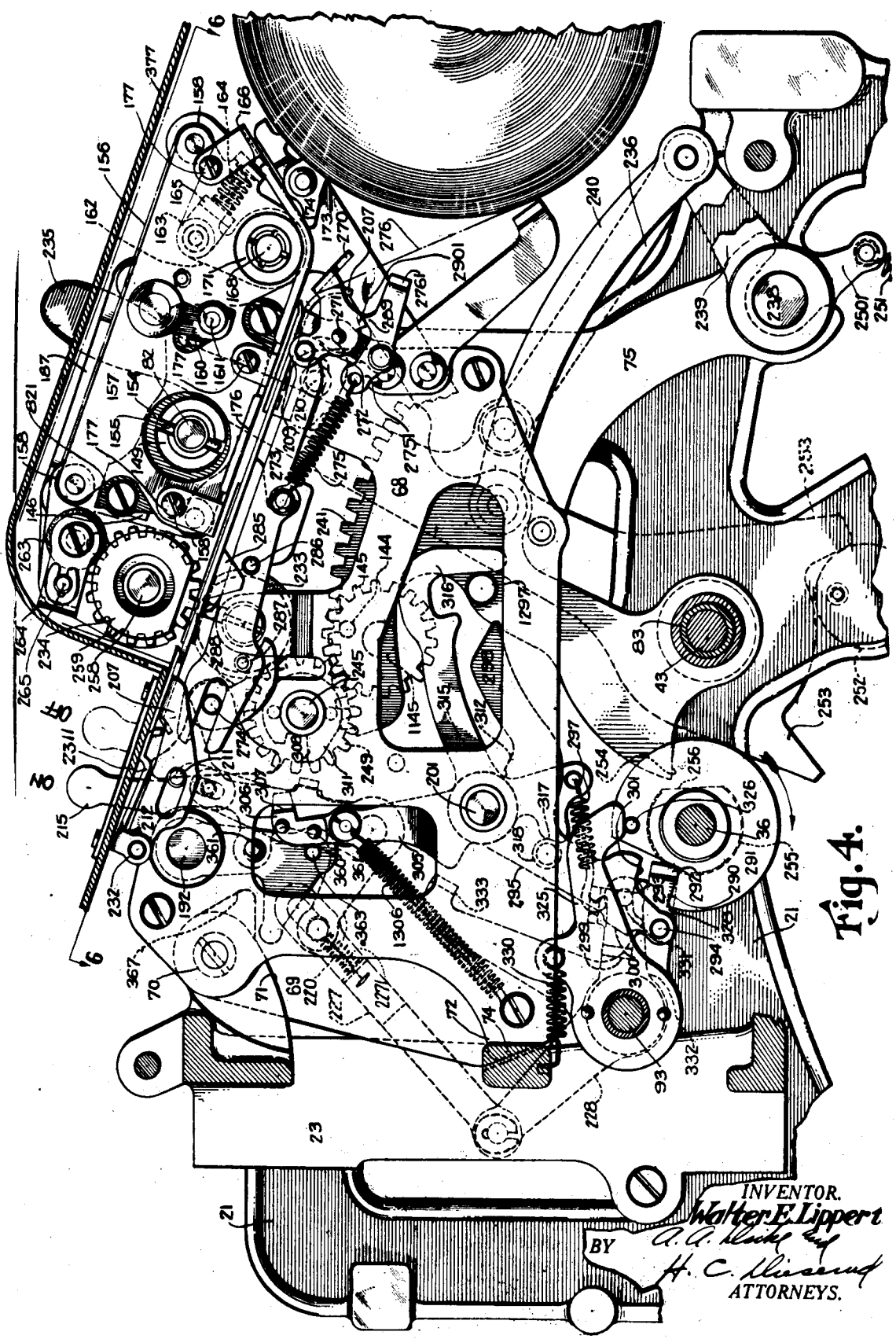

Fig. 4 is another transverse sectional view of the register looking towards the left hand check printer side frame. This view shows the interlocking mechanism and the controlling devices for the same. This view also shows the gripping devices for the check paper and inking ribbon supporting frame attached to the check printer frame.

Figure 5:
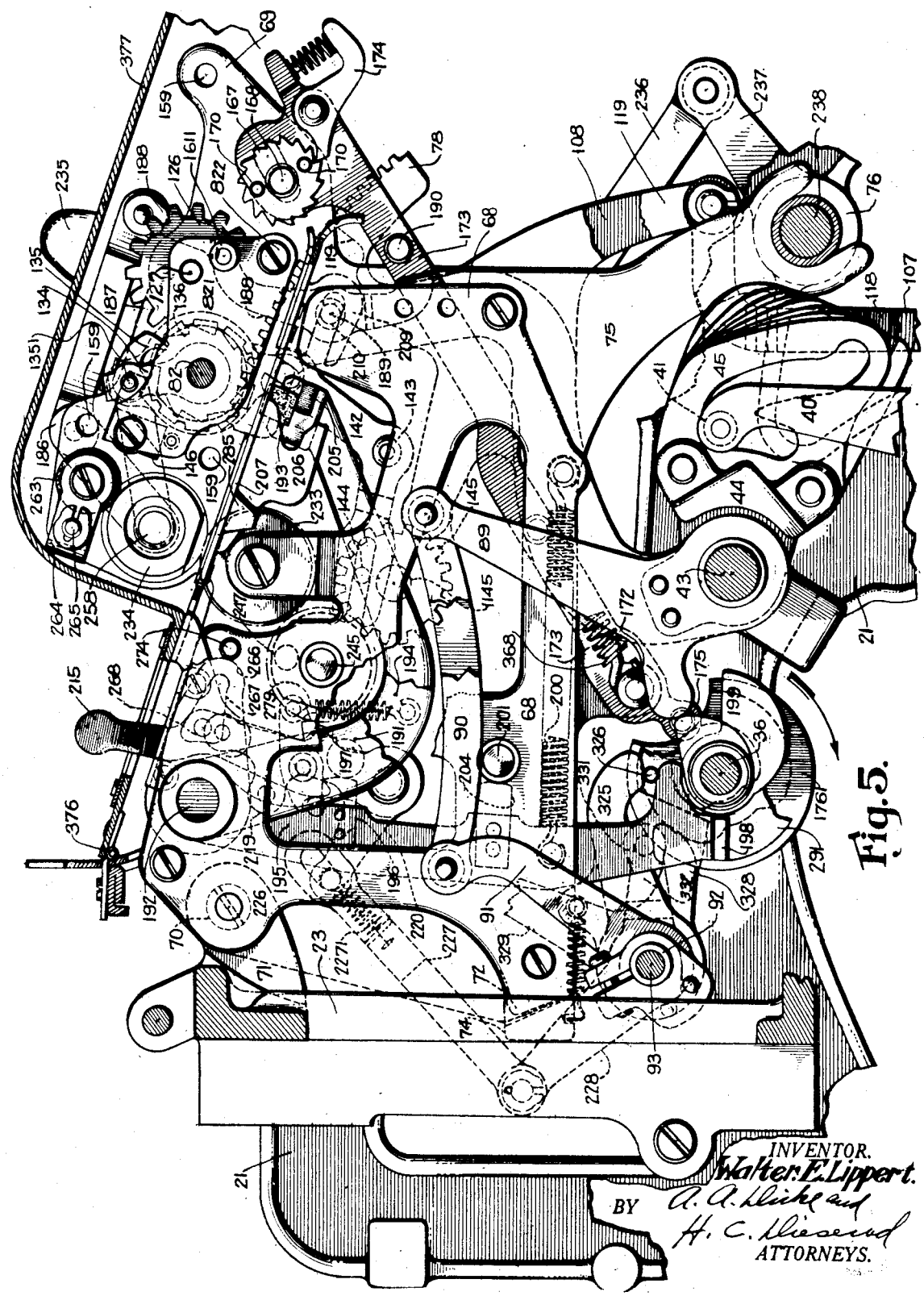

Fig. 5 is a transverse sectional view of the register showing the printing hammers and their related operating means and the devices for disabling them. This view shows the ribbon supporting frame removed and the connections to it from the operating mechanism for feeding the ribbon an increment.

Figures 6, 7:
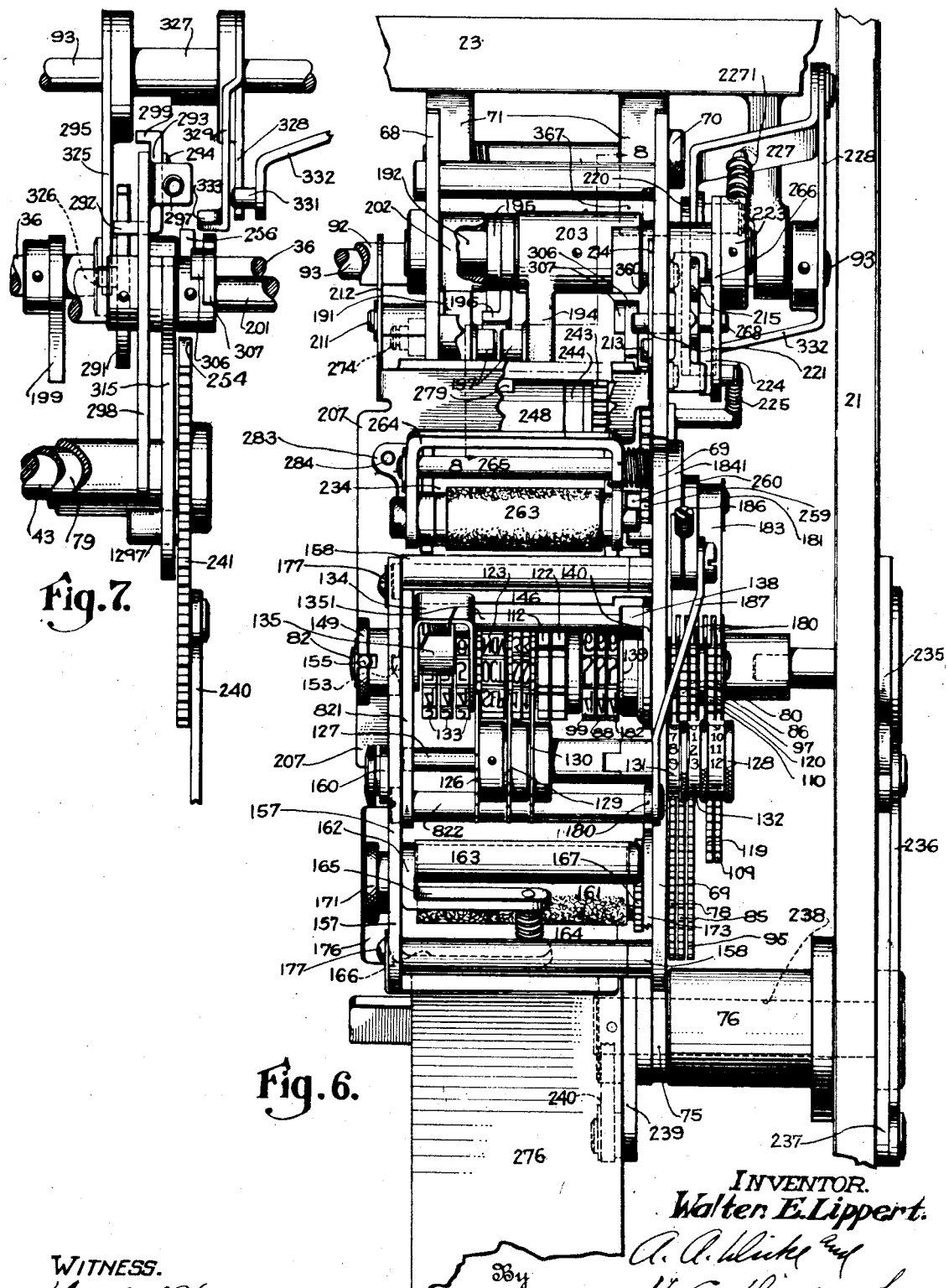

Fig. 6 is a top plan view taken on the line 6—6 of Fig. 4 of the improved check printing mechanism with the check table and ribbon removed in order to more clearly illustrate the various parts of the mechanism.

Fig. 7 is a partial top plan view of the interlocking devices and the associated controlling devices.

Figure 8:
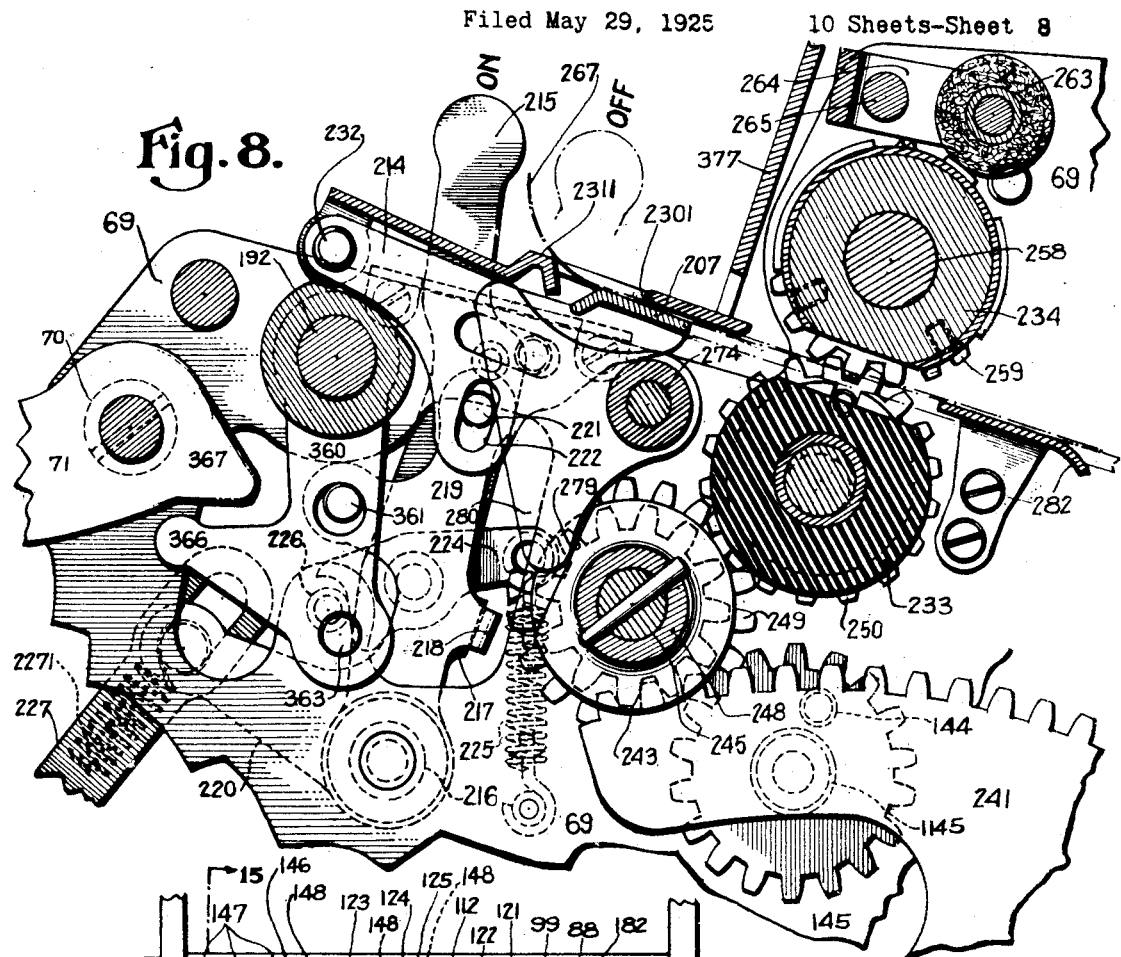

Fig. 8 is an enlarged sectional view taken from the line 8—8, Fig. 6, and shows the check issuing and electro printing devices and the means for moving the check table.

Figure 9:
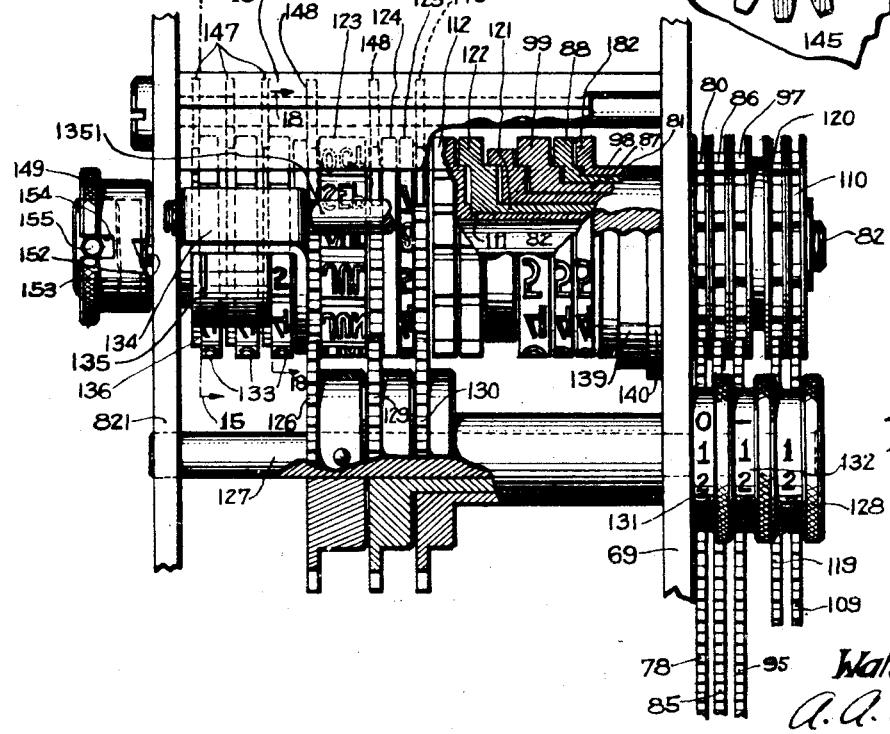

Fig. 9 is an enlarged top plan view of the type carriers and related adjusting mechanism, the devices for printing the dates and adjusting them to their proper positions, and the consecutive number type carriers and associated resetting devices.

Fig. 10 is a detail top plan view of the check table showing the various devices for holding the check paper firmly against the check table.

Fig. 11 is a partial top plan view of the driving mechanism for the feeding and electro roller.

Fig. 12 is a partial top plan view of the electro and the mechanism whereby it may be readily detached from its operating means.

Fig. 13 is a concrete example of one of the checks capable of being issued by the illustrative embodiment.

Fig. 14 shows one of the checks issued by the machine and how the machine over-prints to obliterate or cancel impressions accidentally made when the printing mechanism is operated in sales slip printing condition and no slip has been inserted.

Fig. 15 is a sectional view taken on the line 15—15 of Fig. 9 showing one of the consecutive numbering type carriers and the devices for adding a unit thereto at each operation of the check lever.

Figure 16:
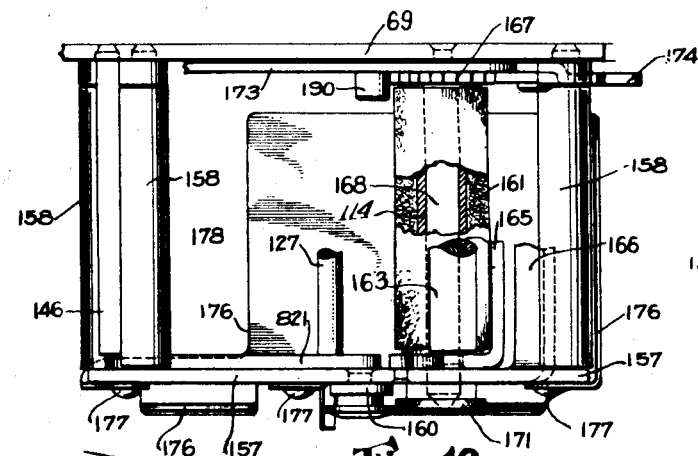

Fig. 16 is a top plan view showing the ribbon supporting frame attached to the check printer side frame.

Figure 17:
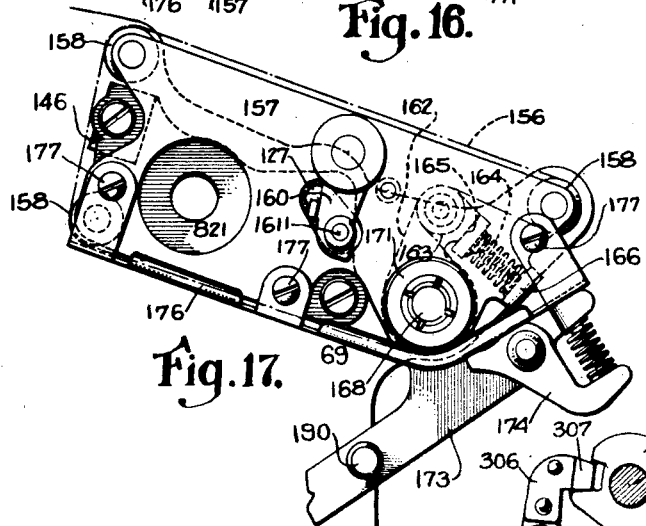

Fig. 17 is a view in side elevation of the mechanism shown in Fig. 16.

Figure 18:
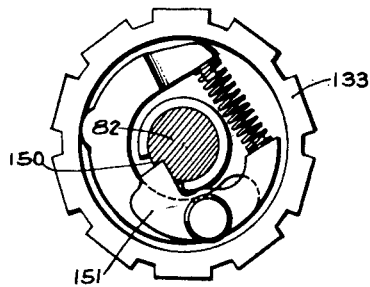

Fig. 18 is a view taken on the line 18—18 of Fig. 9 showing the means for resetting the consecutive numbering type carriers to their zero position.

Figure 19:
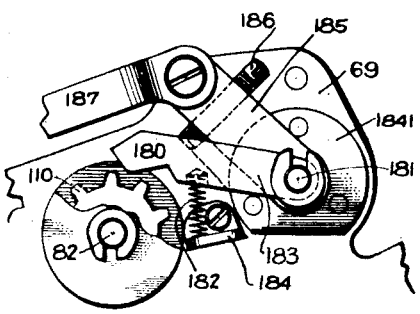

Fig. 19 is a detail of the aligning devices for holding the various type carriers in adjusted positions so as to properly print along a horizontal line.

Figure 20:
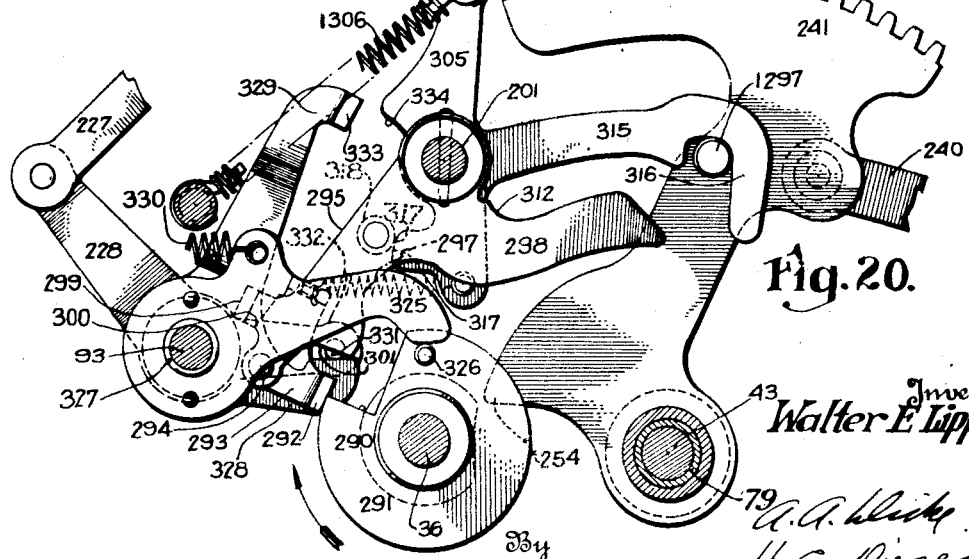

Fig. 20 is a view in side elevation of the interlocking devices between the check handle and the operating keys in ineffective position and the devices for preventing the interlocking mechanism from going into operation when a special key is operated to print upon inserted sales slips.

Figures 1, 21:
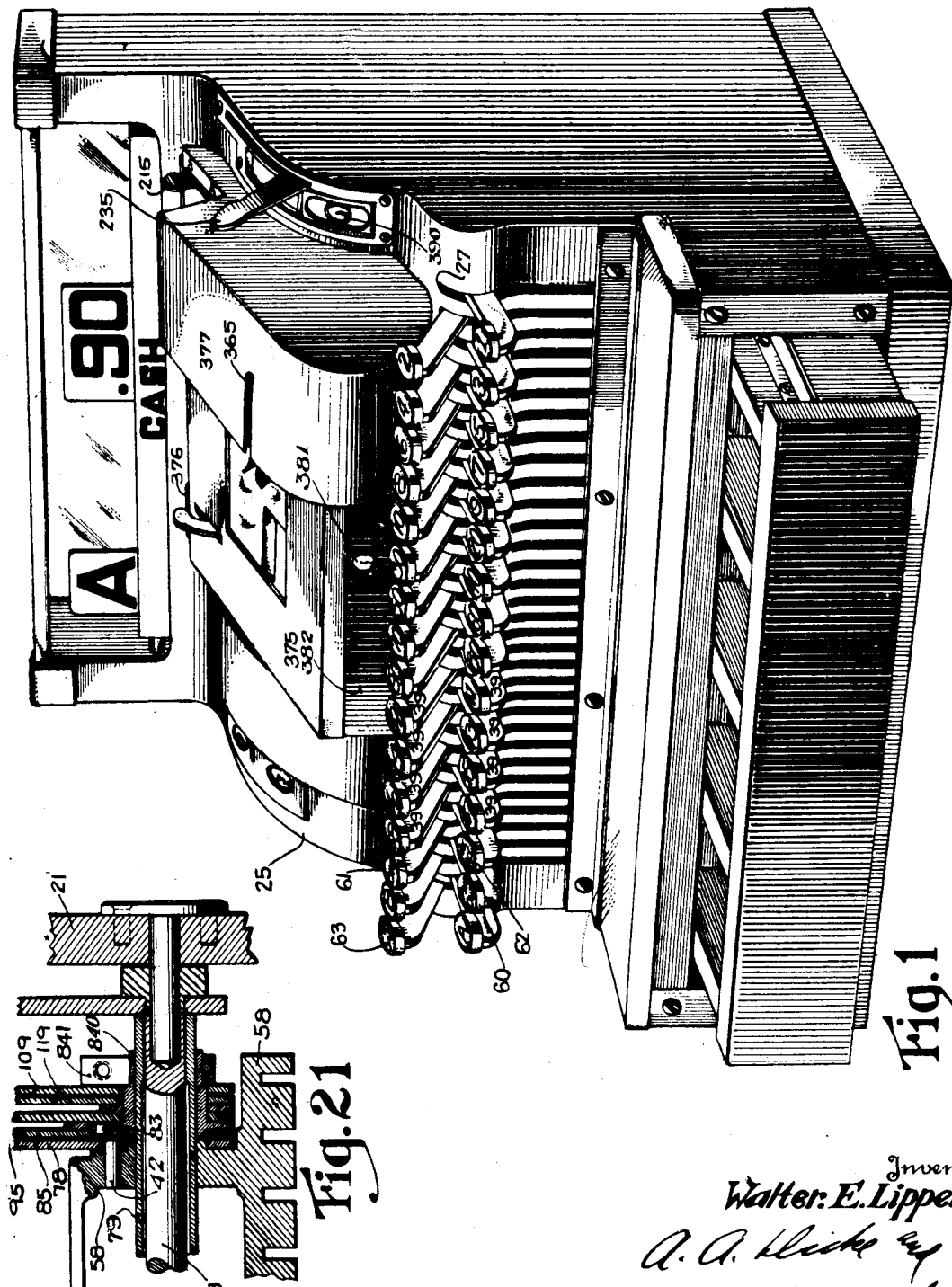
Fig. 1 is a transverse sectional view of the register on the line 1—1 of Fig. 2, showing the key coupler, an associated key, the differential mechanism, the means for operating the type carriers and totalizers, and the means for driving the main rotation shaft.

Fig. 21 is a sectional view showing particularly connections between the cents and dimes differential frames to their associated driving racks.

As shown in the drawings the machine used to illustrate one embodiment of the invention is of the key operated type, that is, various functions, such as, indicating, registering, and printing are effected directly by operation of the keys. Addition of the present improvements does not materially affect the operation of such a machine in any of these respects, but when the keys are operated type carriers which form a part of the new mechanism are adjusted to represent the keys and impressions are then taken from the type carriers upon either a check strip or upon a sales strip, depending upon which kind of printing the machine is intended to do.

In case the mechanism has been prepared or conditioned for check printing, after the keys have been operated and the characters representing them printed on the check strip, a lever, or handle is operated to feed a portion of the check strip containing a record of the keys operated to a position where it may be severed from the strip. Feeding operation is performed by a pair of co-operating rollers driven by the handle, one of which rollers is provided with inked type for printing advertising or other matter on the face of the check.

For certain classes of transactions such as "Charge" transactions, it is desirable to have the machine conditioned so as to print upon an itemized "Charge" slip, the total amount of the items thereby providing a way of insuring the making of a record of the transaction in the record strip printing devices of the machine. The improved machine is provided with a slot into which sales slips may be inserted to receive impressions.

In the present embodiment the work of conditioning the printer for printing upon inserted sales slips is performed by the adjustment of a manipulative device comprising a lever to a certain position, and then operating the "Charge" key in conjunction with the usual amount keys. When the "Charge" key is operated to print upon inserted slips it operates through suitable connections to retain ineffective the interlocking mechanism controlling the sequence of operation of the keys and the check feeding and printing mechanism. The result of this is that the keys may be subsequently operated without requiring an operation of the check lever. When, however, the amount keys are subsequently operated without the operation of the "Charge" key identified with slip printing, the interlocking mechanism is rendered effective preventing a subsequent operation of the keys unless the check lever is first operated.

The interlocking mechanism just referred to is so constructed that after a key or keys have been operated without an operation of the "Charge" key to print upon a check, a second operation of the keyboard can not be performed unless the check feeding mechanism is first operated. Operation of the feeding mechanism will affect the interlocking mechanism to free the keys for operation, but freeing them will at the same time affect the interlocking mechanism to prevent a second operation of the check feeding mechanism without an intervening operation of the keyboard.

Adjusting of the mechanism in preparation for slip printing by an operation of the "Charge" key frees the keys for successive operations without intervening operations of the check feeding mechanism. In fact, the feeding mechanism becomes locked so that it can not be actuated. To print upon sales slips when the mechanism is in slip printing condition, all that is necessary ts to insert the slips to a position where they may receive impressions from the type carriers and then depress the keys representing the items, in conjunction with the "Charge" key. This causes the items to be printed upon the slips, after which the slips are simply withdrawn from the machine.

The mechanism for controlling the condition of the printing mechanism is so constructed that it may be adjusted to prevent operation of the mechanism usually operated to print upon checks or sales slips. The reason for this is that it may at times be desirable to operate the keys of the machine including the "Charge" key, without either issuing checks or printing upon sales slips. When in this non-printing condition the check issuing lever is locked and the interlocking mechanism before referred to is thrown out of commission so that there is no interference with repeated or successive operations of the keyboard.

When the mechanism is operated under check printing conditions, a pair of impression hammers is operated to make the impression, one for printing the consecutive numbers and the other to print the date and description of the item. When the mechanism is adjusted to the non-printing condition both of the impression hammers are inoperative, while under slip printing conditions only the consecutive number impression hammer fails to operate. Under the condition last mentioned, therefore, the consecutive number type carriers do not print upon the inserted slips. And as the consecutive numbering devices are operated to add one directly by movement of the check feeding devices the number cannot be changed or increased because, it will be recalled, the feeding mechanism becomes locked when the printing mechanism is prepared for slip printing.

The feeding operation is as before stated, performed by a pair of co-operating rollers driven by a lever or handle, one of which rollers is provided with inked type for printing upon the face of the check. The machine in the drawings includes mechanism whereby when the printing mechanism is conditioned for printing upon the sales slips the check strip will be reversely moved to a position where, in case the keys should be operated without a sales slip in position, the impression from the type carriers will be made in the space usually printed upon by the printing roller. Then when the machine is changed to a check printing condition the check strip is restored to its normal relation with the printing and feeding rollers and subsequent operation of the feeding and printing mechanism will overprint or obliterate the incorrect type carrier impression, and the impression for the transaction for which the check is issued will occur in the correct space on the check.

Associated with the improvements just mentioned are devices for preventing an overrotation of the electro printing roll in the event that the check issuing lever should be quickly and violently operated. To prevent a lateral displacement of the check strip and to facilitate the entry of a new strip when replenishing the supply, improved devices have been provided and incorporated in the present embodiment. The frame which holds the inked ribbon is formed as a unit and may be easily and readily detached at will. The check and slip printing mechanism has been designed as a unitary structure and may be readily detached from the associated registering mechanism. but this is only permitted when the controlling lever is set to a certain position. Adjustment of the lever to this position locks the electro and prevents the disturbance of the timing relation between it and the associated train of mechanism. Other improvements will appear hereinafter as the specification progresses.

The general organization and operation of the mechanism as a whole having been thus outlined, the preferred construction of the various parts above referred to will now be described more in detail and the construction and operation of certain accessory mechanisms explained.

*Supporting frames*

The various parts of the mechanism are supported by suitable frame work comprising a base casting 20, and side frames 21 and 22, the latter being connected at their upper rear ends by a frame-work 23 (Fig. 2) provided to support the indicating and check or slip printing mechanism. Further cross connections comprise a front tie bar 19 (Fig. 3) between the lower front part of the machine side frames 21 and 22, and a tie bar 24 across the lower rear part. The mechanism is enclosed by a cabinet 25 which may be of any suitable form and of any desired material. The cabinet 25 is suitably apertured at its upper end to render the indicators visible and has, furthermore, a number of lids hinged thereto for providing access to the mechanism for replenishing the paper supply, etc.

Keyboard

The illustrative machine is provided with thirty-two keys there being three groups of amount keys, one group for entering amounts from 1¢ to 9¢, one group for entering amounts from 10¢ to 90¢, and the remaining group of amount keys for entering denominations from $1.00 to $8.00, inclusive. Four transaction keys 60, 61, 62 and 63 (Fig. 2) are provided for denoting the types of transactions entered in the machine. The remaining group comprises two keys situated at the left of the keyboard and are known as "Clerk's" or classification keys.

The amount, clerks' and transaction keys (Figs. 1 and 3) are pivoted upon a shaft 26 extending transversely and journalled between the side frames 21 and 22 of the machine. The operating keys are guided in their reciprocating movement by slots 27 (Fig. 1A) formed in the front part of the cabinet 25 and are guided at their rear ends by a vertical plate 28 (Fig. 3) attached to the rear tie bar 24. Resting upon the rear ends of the keys is a key coupler 29 journalled at 30 between the side frames 21 and 22. The coupler 29 has a nose 31 co-operating at times with notches 32 formed in the rear ends of the keys. When the outer ends of the keys are depressed the key coupler 29 is rocked clockwise, (as viewed in Figs. 1 and 3) and the nose 31 thereon enters the notches 32 formed in the rear ends of the keys. The purpose of such key coupler mechanisms is well known in the art and need not be discussed herein in detail.

Connected to the key coupler 29 is a rack plate 33 (Figs. 1 and 2) provided with oppositely facing rack teeth 34 which alternately mesh with a gear 35 fast to a main operating shaft 36 journalled between the side frames 21 and 22. The arrangement of this mechanism is such that a reciprocation of the key coupler 29 will effect a complete rotation of the gear 35 and the shaft 36 to which the gear is secured. The shaft 36 is designated as the main operating shaft since it is given a complete rotation at each operation of the machine and it carries cams and other devices for operating various parts of the registering and printing mechanism.

In nearly all forms of cash register construction it is necessary after registration has commenced that some device be provided to compel a complete performance of the registering mechanism before a subsequent operation of the machine can be effected. The mechanism for accomplishing this is shown in Fig. 1 of the drawings and comprises a ratchet wheel 37 secured to the main operating shaft 36 and against which a spring-pressed retrograde pawl 38 bears.

Differential mechanism for record strip type carriers

Figure 2:
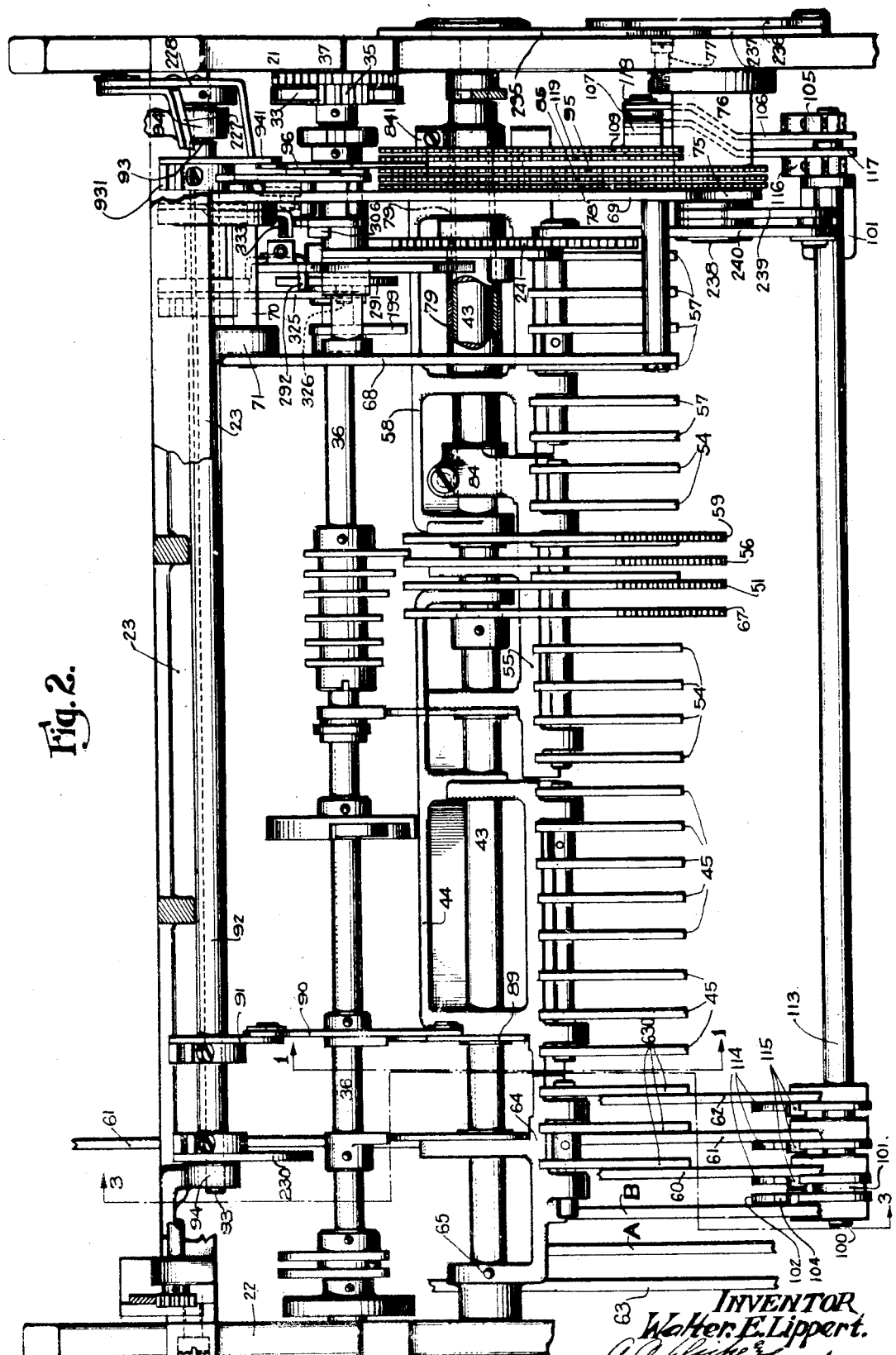
Fig. 2 is a top plan view of the differential devices and shows particularly the type carrier adjusting and setting mechanism.
Figure 3:
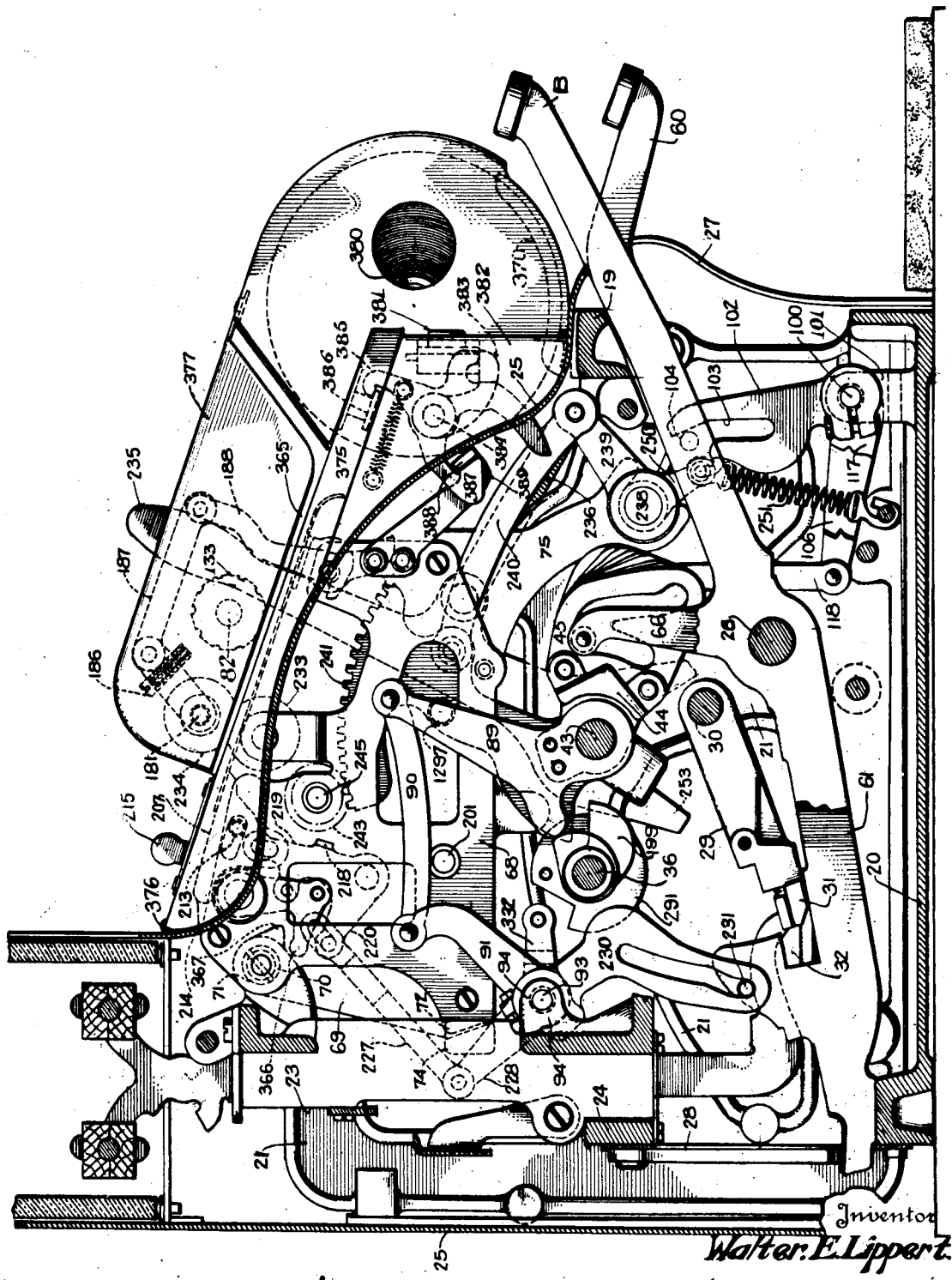
Fig. 3 is a transverse sectional view taken on the line 3—3 of Fig. 2 of the register showing the connections to the special key for moving the check table when the machine is conditioned for printing upon inserted sales slips.

The differential mechanisms or devices controlled by the various groups of keys are all similar in construction and principle and a description of one will suffice for all. Referring more particularly to Fig. 1 reference character 39 designates one of the amount keys related to the dollars group. Each of the amount keys 39 is provided with an upwardly extending arm 40 carrying at its extreme upward end a suitable anti-friction roller 41 co-operating with slots formed in cam plates 45. As shown in Figs. 1, 2 and 3 loosely mounted upon a transverse shaft 43 is a frame 44 provided with spaced slots in which is secured a series of the cam plates 45, one for each key. As best shown in Fig. 1 the cam plates 45 are provided with L-shaped slots 49 and 50, the slot 50 being concentric with respect to the shaft 43. The slots 49, however, are graduated so that when the roller 41 carried by the arm 40 of a depressed key plays in the slot 49 of its associated cam plate, it will move the frame 44 and attached parts differentially to an amount corresponding to the value of the key depressed. Whenever the frame 44 is operated by the depression of a key 39 the rollers 40 of the undepressed keys will play in the arcuate slots 50 of their respective cam plates 45 thereby permitting the frame 44 to be raised differentially without interfering with the rollers 41 of the unoperated keys.

As shown in Figs. 1 and 2 the differential frame 44 has attached thereto a segmental rack 51. In continuous mesh with the segmental rack 51 is a pinion 52 attached to an item type carrier 53, adapted to print upon a record strip printing mechanism shown in the Fuller application and the British patents above identified. From the above it will be evident that since there are eight keys in the dollars group and a corresponding number of cam plates, the frame 44, segmental rack 51 and the type carriers 53 may be brought to any one of eight different positions by the depression of one of the dollar keys 39.

Situated below the type carriers are two totalizers, (Fig. 1) designated by the letters "A" and "B". These are adapted to be brought into mesh at the proper time with the teeth of the segmental rack 51. The operation of each totalizer is controlled by its corresponding clerk or classification key. Since the totalizer engaging mechanism forms no part of the present invention, it is not shown or described in the present application. A showing and description thereof may be found, however, in the Fuller application and the British patents above mentioned.

Associated with the dimes keys, of which there are nine, are a corresponding number of cam plates 54 (Fig. 2) secured to a frame 55 loose upon the shaft 43 hereinbefore mentioned. The cam plates 54 are similar to the cam plates 45 just described in connection with the cents group of keys, and are operated upon by rollers carried by keys related to the dimes group. Secured to the dimes differential frame 55 is a segmental rack 56 in continuous mesh with its related item type carrier 53 appurtenant to the record strip printing mechanism, and also adapted to actuate the tens order totalizer wheel of either totalizer.

As premised hereinbefore there are nine keys for registering and indicating amounts from 1¢ to 9¢. The cents keys operate upon a like number of differentially slotted cam plates 57 (Fig. 2) in the same way as previously described in connection with the dollars groups. The differential frame 58 which carries the nine cam plates 57 (a number of these being omitted in Fig. 2 for the sake of clearness) has secured thereto at its left end a segmental rack 59 for adjusting its related item type carrier and bringing to the printing line a type corresponding to the value of the key operated.

The illustrative machine, as suggested heretofore, has four special or transaction keys for "Paid out", "Charge", "Received on account", and "No sale" transactions and these are designated respectively by the numerals 60, 61, 62, and 63 (Fig. 2). The "No sale" key 63 has certain functions such as operating the drawer release mechanism but it does not set a type carrier. There is, however, a type carrier provided for printing the characters designating the various transaction keys, but it is normally held in a position where it prints a character representing both "No sale" and "Cash" transactions and is shifted to any one of the three positions by one of the keys 60, 61 and 62. The transaction keys are provided with upwardly extending arms 66 (Fig. 3) (like the arm 40 of one of the dollar keys) engaging slots in cam plates 630 (Fig. 2) rigidly mounted in a frame 64 pinned at 65 to the shaft 43. Secured to the shaft 43 is a segmental rack 67 for setting the special type carrier in the record strip printing mechanism. The slots in the cam plates 630 carried by the frame 64 are also graduated so that each of the transaction keys will impart a different degree of movement to the frame 64 and consequently to the shaft 43 and segmental rack 67.

*Check and slip printing mechanism*

In addition to having a recording mechanism for printing the amounts and identifying characters upon a record strip retained within the machine (shown fully in the application S. N. 263,125 and the British patents hereinbefore mentioned) the register shown herein is provided with a suitable printing mechanism for either printing upon an issued check or an inserted slip. Being thus provided with a check issuing and slip printing device and a record strip, the machine affords protection to the customer and also to the proprietor or manager of the business. The issued check or inserted slip which is printed upon is given to the customer as a receipt, and a record strip receives an impression identical to that printed upon the issued check or inserted slip so that the proprietor is provided with a printed record of every transaction that has taken place.

In addition to printing the amounts, etc., on the check strip suitable printing mechanism has been provided to print upon the check a consecutive number, as well as the date of the transaction, and an electro-type which is operated by the check issuing device prints upon the check the name of the company and any additional matter desired, such as, an advertisement of the establishment in which the machine is used. A sample of the work performed by the check printer is shown in Figs. 13 and 14. From these figures it may be seen that the type carriers of the check printer must be adapted for printing "amounts", a "transaction character" and a clerks "identifying character" the "date" of the transaction and finally a "consecutive number" of the check respectively from right to left. In addition to the above, the printing roller prints the name of the proprietor, his address and other advertising matter. When the mechanism is used for printing upon an inserted slip or statement the type carriers merely print the date of the transaction, the amount, one of the various characters used to identify the nature of the transaction and a letter indicating the clerk operating the machine.

*Check printer framework*

The printer mechanism for printing upon checks or inserted slips is supported by two vertical side plates 68 and 69, the upper rear ends of which are secured by a screw 70 to ears 71 integral with the rear supporting machine frame 23, (Figs. 2, 3, 4 and 6). The lower rear portion of the side plates 68 and 69 have extensions 72 projecting into milled vertical slots formed in a horizontal cross rib 74 (Fig. 4) integral with the rear supporting frame 23. As best shown in Figs. 2, 3, 4 and 5, the right plate 69 projects downwardly at 75 and is suitably bifurcated to receive a bushing 76 secured by screws 77 to the right side frame 21 (Fig. 2). The check and slip printer mechanism is supported by the plates 68 and 69 and may be removed as a unitary structure from the rest of the associated mechanism.

Differential mechanism for check and slip type carriers

The connections between the different differentially adjusted members and the type carriers associated with the check and inserted slip mechanism will now be given. The connections can be easily followed by an inspection of Figs. 2, 9 and 21.

Attached to the extreme right hand end of the differential frame 58 associated with the cents group of keys, by a pin 42 is a segmental rack 78. The segment frame 58 is loose upon the shaft 43 at one end and at the other end is loosely mounted upon a tube 79 surrounding the shaft 43. The rack 78 meshes with a pinion 80 (Fig. 9) secured at one end of a tube 81. The tube 81 is one of a series of nested tubes which are concentric with a shaft 82 which is journalled between the check printer side frame 69 and a type carrier support frame 821 the latter being attached to the right check printer side frame 69 by a tie rod 822 and a block 146 (Figs. 5 and 6).

All of the tubes have secured thereto at their extreme ends pinions which are differentially actuated so as to set up type carriers which are attached to the opposite ends. Secured to the tube 81 is a type carrier 182 for printing the characters 1¢ to 9¢ upon the check or inserted slip.

The frame 55 associated with the dimes keys is secured by a clamp 84 to the sleeve 79 overlying the shaft 43, (Figs. 2 and 21). A split clamp 841 secured the sleeve 79 to a collar 840 which has pinned thereto by a pin 83 a segmental rack 85. The segmental rack 85 is in mesh with a pinion (Fig. 9) 86 connected by a tube 87 to a type carrier 88 for printing characters representing the 10¢ to 90¢ amounts.

The connections between the differentially actuated frame 44 related to the dollars keys and the type carriers for printing the dollars characters upon the check strip comprises an upwardly extending arm 89 (Figs. 2 and 5) pinned to the left hand end of the dollars differential frame 44. The upwardly extending arm 89 is connected by a link 90, to an arm 91. The arm 91 is clamped to a sleeve 92 concentric with a shaft 93 journalled in ears 94 integral with the rear supporting frame 23. At the right hand end of the sleeve 92 is a clamp 931 attached to which is an arm 941 (similar to arm 91) connected to the segmental rack 95 by a link 96. The segmental rack 95 is loose upon the collar 840 and meshes with a pinion 97 connected by a tube 98 to a type carrier 99 for printing characters to represent the dollars.

As shown in Figs. 2 and 3 a shaft 100 journalled in brackets 101 attached to the base plate 20 has attached thereto a cam plate 102 formed with a cam slot 103 co-operating with a stud 104 carried by the "B" key. At the right end of the shaft 100 is a clamp 105 attached to which is an arm 106 connected to a link 107 (Figs. 2 and 5). The upper end of the link 107 is secured to a downward extension 108 of a segmental rack 109 loose upon the collar 840 and in mesh with a pinion 110 (Fig. 9) connected to a tube 111 having at its extreme left end a type carrier 112 for printing either the letter "A" or the letter "B" on the check. Normally the type carrier 112 is adjusted so that it will print the letter "A" but whenever the "B" key is depressed the stud 104 coacting with the cam slot 103 will move the cam plate 102 (Fig. 3) forwardly thereby rocking the shaft 100 and through the connections just described adjusting the type carrier from a position for printing the letter "A" to a position whereby it will print the letter "B" upon the check or inserted slip.

Secured to a sleeve 113 overlying the shaft 100 just referred to are a plurality of cam plates 114 similar to the cam plate 102 described in connection with the cam plate associated with the "B" key. The slots in the cam plates 114 are inclined differentially so that the studs 115 carried by the transaction keys 60, 61 and 62 will rock the sleeve 113 different amounts. The right hand end of the sleeve 113 has secured thereto a clamp 116 to which is secured an arm 117 (Figs. 2 and 3). To the rearward end of the arm 117, is articulated a link 118 (Fig. 5) connected to a downward extension of a segmental rack 119 loose upon the collar 840. As shown in Fig. 9, the segmental rack 119 is in mesh with a pinion 120 connected to a tube 121 and integral with a type carrier 122 having on its periphery type for printing characters to represent the different classes of transactions. From the foregoing it is clear that the differential movement of the sleeve 113 by the associated transaction keys will effect corresponding movements of the type carrier 122 to its various printing positions.

Date printing type carriers

In axial alignment with the amount printing type carriers 182, 88 and 99 and in line with the clerks and transaction type carriers 112 and 122 (Fig. 9) are type carriers 123, 124 and 125 for designating dates. Meshing with the teeth of a pinion rigid with the type carrier 123 for printing the months is a pinion 126 integral with a collar pinned to a transverse shaft 127 journalled in the check printer side frame 69 and type carrier support frame 821. At the right hand end of the shaft 127 is a knurled knob 128 having on its periphery numbers representing the different months of the year. The type carriers 124 and 125 for printing the days of the months are provided with similar pinions meshing with pinions 129 and 130 respectively, rigid with tubes overlying the shaft 127 and provided with setting knobs 131 and 132, by means of which the type carriers may be adjusted to represent the various days of the month.

Consecutive numbering type carriers

Mounted upon the shaft 82 and, therefore in axial alignment with the other type carriers just mentioned are three type carriers 133 for printing consecutive numbers upon checks. These type carriers and the mechanism for operating them are of the usual deep notch transfer type. A bail 134 (Figs. 6, 9, and 15) loose upon the shaft 82 has journalled therein a shaft 1351 carrying the usual spring-pressed operating and carrying pawls 135 co-operating with the ratchet wheels 136 attached to each type carrier. As best shown in Fig. 15 the engaging ends of the pawls 135 terminate in different planes, that is, the contacting ends of the pawls are successively of different lengths and terminate at different distances above the ratchet wheel supporting shaft 82. These ends co-act with notches formed in the ratchet wheels and also a deep notch 137. When a lower order wheel has passed the "nine" position the engaging end of its related pawl will drop in the deep notch, thereby permitting the carrying pawl 135 corresponding to the next higher wheel to engage its ratchet wheel. In this manner when the bail 134 is operated a unit it will be transferred to the wheel of the next higher order. This deep notch transfer mechanism is well known in the art and for this reason is only briefly explained herein.

For operating the bail and the carrying pawls the following mechanism is employed. As best shown in Figs. 6 and 15, the shaft 1351 is extended to the right (Fig. 6) and is received by a bushing 138 carried by an arm 140 (Fig. 15) attached to a hub 139 (Figs. 6 and 9) overlying the outer tube 81. The lower part of the arm carries a stud 141 engaging the upper end of a bell-crank 142 pivoted at 143 to the left side of the right check printer side frame 69. The rearward end of the bellcrank lever 142 is slotted to engage a stud 144 carried by a gear 145 pivoted on the frame 69 at 1145 and which is rotated in a counter-clockwise direction each time that the check lever is operated.

Whenever the check lever is actuated to feed a check out of the machine the gear 145 is rotated and consequently acts upon the bell crank 142 and other connections just described to oscillate the bail 134 a sufficient distance to add "one" on the consecutive numbering type carriers.

Aligning mechanism for date and consecutive numbering type carriers

As best shown in Figs. 9 and 15 the block 146 is mounted between the check printer side frame 69 and the type carrier support frame 821 and is recessed to receive spring-pressed retrograde pawls 147 bearing against the ratchet wheel teeth 136 for retaining the numbering type carriers in their various positions.

In a similar manner aligning pawls 148 (Fig. 9) are provided for aligning the type carriers 123, 124 and 125 for printing the dates and months of the year. Other devices have been provided for aligning the amount and other identifying character type wheels when adjusted to their proper positions, but these will be described hereinafter.

Inking ribbon mechanism

The inking mechanism for printing from the consecutive numbering type carriers and the other type carriers in alignment therewith includes an inking ribbon 156 (Fig. 4) passing below the type carriers and around suitable rollers. The rollers are carried by a frame which may be detached from the check printer frame so that a new ribbon may be replaced at will or the ink roller moistened with a fresh supply of ink. The frame which supports the rollers is indicated by reference character 157 (Figs. 16 and 17) and the three guide rollers carried thereby by reference characters 158. The ends of the rods upon which are mounted the different guide rollers 158 are adapted to be received by holes 159 formed in the right check printer side frame 69 (Fig. 5) and when they are in co-operative relationship the ribbon supporting frame may be latched by a latching lever 160 carried by the ribbon supporting frame 157 engaging a stud 1611 carried by the type carrier supporting frame 821. The ribbon 156 passes over an inking roller 161 (Figs. 6 and 16) mounted in the ribbon supporting frame 157 and in order to maintain a certain amount of tension upon the ribbon there is provided an arm 162 (Fig. 4) carrying a tension roller 163. A spring 164 interposed between a lug 165 integral with the arm 162 and a lug 166 integral with the ribbon supporting frame 157 serves to force the tension roller 163 rearwardly so that a certain amount of tension upon the ribbon is maintained. The path of the ribbon around the various rollers is best shown in Fig. 17. The underside of the frame 157 is provided with a bent shield 176 attached thereto by screws 177 (Figs. 4, 16 and 17). This prevents the check strip or slip from being soiled by contacting with the inking ribbon. The shield is, however, cut away at 178 to permit the impression hammers to strike the ribbon, check and type carriers.

The ribbon is given a step of movement at each operation of the machine, this not only prevents successive impressions from the same portion of the ribbon, but it also serves to bring the different portions of the ribbon in contact with the inking roller 161 and thereby permitting the latter to moisten or apply ink to the ribbon.

The mechanism for driving the ribbon comprises a ratchet wheel 167 (Figs. 5, 6 and 16) loosely mounted upon a rod 168 secured to the upper end of the right check printer side frame 69. The rod 168 is adapted to be received within a hollow shaft 114 (Fig. 16) carrying the inking roller 161. One end of the hollow shaft 114 is provided with slots which are adapted to be received by short pins 170 (Figs. 5 and 16) carried by the ratchet wheel 167. In order to insure that the pins 170 and notches are in co-acting relationship when the ribbon supporting frame is attached to the check printer side frame a manipulative knob 171 integral with the hollow shaft 114 carrying the inking roller 161 is provided for turning the inking roller a slight amount so that the pins and notches may be brought into co-acting relationship. Slidably mounted at its upper end on the rod 168 and at its lower end on a stud 172 carried by the check printer side frame 69 is a slide 173 (Fig. 5). The slide 173 carries at its upper forward end a spring-pressed feeding pawl 174 engaging with the teeth of the ratchet wheel 167. At its lower end the slide carries a roller 175 co-operating with a box cam 1761 fast to the rotation shaft 36. The shaft 36, it will be recalled, makes a complete rotation at each operation of the machine and the mechanism just described is so proportioned that the slide 173 will be operated to impart a step by step movement to the ratchet wheel 167 and the inking roller 161.

Zero reset for consecutive numbering wheels

The consecutive numbering type carriers may be reset to zero whenever desired by a spring urged manipulative knurled knob 149 (Figs. 4, 6 and 9) concentric and movable with the shaft 82 and located outside of the type carrier supporting frame 821. As best shown in Fig. 18 the shaft 82 is provided with a notch 150 which coacts with the points of resetting pawls 151 carried by each of the consecutive numbering type carriers 133. The arrangement is such that when the shaft 82 is rotated the notch 150 will pick up the variously positioned type carriers 133 and turn them to their zero positions. As indicated in the foregoing the manipulative knob 149 is spring-pressed so that a diagonal notch 152 (Figs. 6 and 9) therein engages a pin 153 carried by the frame 821, thereby preventing any accidental movement of the zeroizing shaft 82 and to further determine the completion of the resetting operation. In order to provide a simultaneous movement of the manipulative knob and the shaft 82 the former is provided with a square slot 154 in engagement with a pin 155 passing through the shaft 82. To reset the consecutive numbering wheels the manipulative knob 149 is pulled outwardly away from the frame 821 against the tension of the spring until the abrupt edge of the diagonal notch 153 and the pin 152 are disengaged. Upon a clockwise (Fig. 4) rotation of the manipulative knob 149 the shaft 82 will also be rotated to reset the consecutive numbering wheels. When the knob is given a full rotation the spring will urge the said knob so that the diagonal notch 152 and pin 153 are again in their normal position, and this movement of the knob will serve as a signal that the rotation of the shaft has been completed.

Aligning mechanism for item and identifying type carriers

The mechanism whereby the various differentially adjusted pinions and the item and identifying type carriers movable therewith are aligned so that the type will print along a horizontal line is shown in Figs. 3, 6, and 19. Referring to these figures there will be seen a plurality of aligning pawls 180 integral with a pawl carrying member 183 and in engagement with the teeth of their respective pinions 80, 86, 97, 110 and 120. The pawl carrying member 183 is pivoted upon a short stud 181 and is urged upwardly by a spring 182 (Fig. 19) interposed between the pawl carrying member 183 and a right angle bracket 184 carried by the check printer side frame 69. Loosely mounted between the pawl carrying member 183 and a plate 1841 secured to the check printer side frame 69, is a pawl operating member 185 provided with an adjustable screw 186 the lower end of which contacts with the pawl carrying member 183. The upper end of the pawl operating member 185 has connected thereto a link 187 connected to the upper end of an arm 188 pivoted to a short stud 189 carried by the side frame 69 (see Fig. 5). The lower end of the arm 188 co-operates with a stud 190 carried by the slide 173. From the above it will be clear that whenever the slide 173 is reciprocated by the cam 1761 upon the rotation shaft 36 the stud 190 contacting with the lower end of the arm 188 will rock all of the aligning pawls into engagement with the interdental spaces of the pinions to suitably align the type carriers.

Printing hammers for type carriers

The impressions are taken from the consecutive number, special character, date and item carriers by two percussion hammers, one for printing the consecutive number, and the other to print the date, amounts, and identifying characters. As shown in Fig. 6 the consecutive numbering hammer 191 has a hub 202 loose upon a shaft 192 (Fig. 5) journalled between the check printer frames 68 and 69. At its forward end the hammer 191 carries an impression block 193 of rubber or suitable material and of sufficient length to take an impression from all three of the consecutive numbering type carriers. The hammer 194 for printing from the rest of the type carriers is substantially the same as the consecutive number type carrier with the exception that its hub 203 is pinned to the shaft 192. At its forward end the hammer 194 carries an impression block which is not shown in the drawings, but is the same as the impression block 193 previously described, except that it is long enough to print from all the date, amount, and identifying printing type carriers.

Printing movement is imparted to the impression hammers by an arm 195 (Fig. 5) pivotally mounted between the hubs of the percussion printing hammers and loose upon the shaft 192. The forward edge of the arm 195 carries a block or shoulder 196 in engagement with studs 197 carried by the two impression hammers 191 and 194. Below the shoulders 196 is a second block or shoulder 204 bearing against a shaft 201 journalled between the frames 68 and 69. At its lower end the arm 195 carries a lug 198 in the plane of rotation of a cam 199 fast to the rotation shaft 36. During the rotation of the shaft 36, the cam 199 will act on the lug 198 to swing the arm 195 against the tension of a spring 200 until the cam passes out of engagement with the projection, whereupon the spring 200 will snap the arm 195 forwardly until it is arrested by the shaft 201 and the shoulder 196 on the arm 195 will strike the studs 197 carried by each of the hammers. As best shown in Fig. 5 the hammers normally rest with their studs 197 in engagement with the shoulder 196 of the impression hammer operating arm 195 and in this normal position the impression blocks carried by the hammers are at some distance from the type carriers. When the hammer operating arm 195 is forced rearwardly by the eccentric portion of the cam 199 the hammers will follow and when the cam releases the arm both of the hammers will be thrown against the type carriers to take impressions.

*Disabling mechanism for printing hammers*

The mechanism previously mentioned whereby the consecutive number impression hammer 191 may be prevented from printing or by which under certain conditions both hammers may be disabled, performs its function by moving the hammer or hammers toward the typecarriers far enough to carry the studs 197 out of engagement with the normally coacting portion 196 on the hammer operating arm 195 and holding them in that position. With this in view the consecutive number hammer 191 is provided with a shoulder 205 (Fig. 5) which co-acts with a notch formed in a lug 206 integral with a movable table 207. The table 207 will be presently described in detail and for the present it will suffice to say that the table 207 is moved either during an operation of the machine by the depression of the "Charge" key 61 or by the movement of a control lever 215 from a position designated as "On" to a position designated as "Off". When in the "Off" position the control lever affects the operability of the check and slip printing mechanism so that a check cannot be issued or an inserted slip printed upon. When in this position the consecutive number hammer will be disabled so that it will not operate to print upon the check paper. The manner by which the movement of the table 207 is effected by the adjustment of the control lever 215 will now be explained.

The check table 207 is slidably mounted with respect to the side frames 68 and 69 at its forward end by a bracket 208 (Fig. 10) attached to the underside of the table 207 and having lugs 209 (Figs. 4 and 5) formed with guide slots engaging guide studs 210 (Fig. 10) secured to the frames 68 and 69. At its opposite or rearward end the table 207 is guided by a stud 211 (Figs. 4, 6 and 10) secured to the frame 68 and engaging a slot in a lug 212 integral with the rear end of the table. In a similar manner the table 207 is guided at its right rear end by a guide stud 213 (Figs. 6 and 10) secured to the frame 69 which is in co-operation with a slot in a lug 214 integral with the table 207. Being thus guided in its reciprocating movements the table is capable of being adjusted to either of two positions for effecting various functions.

The mechanism for moving the table by the adjustment of the control lever 215 to disable the consecutive number hammer is shown in Figs. 6 and 8. The control lever 215 is loosely pivoted upon a short stud 216 on the frame 69 and is provided with a forward projection 217 bearing against a lug 218 integral with a two armed member 219, 220. The arm 219 carries a stud 221 co-operating with a vertical slot 222 formed in the lug 214 which as previously stated is integral with the table 207. From the above it will be clear that when the control lever is moved from its "On" to its "Off" position the projection 217 bearing against the lug 218 will move the arm 219 and through the pin and slot connection 221, 222, will move the table 207 so that the consecutive number printing hammer will not operate during an operation of the machine.

In order to insure that the control lever 215 will, when it is returned to the "On" position also return the arm 219 and thus the table 207 there is provided a pawl 224 pivoted to the control lever and urged downwardly by a spring 225 so as to hook over the lug 218. The pawl is held up in its normal disengaged position by a stud 226 secured to the frame 69 and whenever the control lever is moved from its "On" to its "Off" position the pawl will hook over the lug 218. This will insure a simultaneous forward and return movement of the control lever 215 and the table 207 when the control lever is returned to the "On" position.

When the control lever is in its "Off" position the amount and identifying character printing hammer 194 is also disabled. The means for doing this comprises a lever 266 (Figs. 5, 6 and 10) attached to a collar 223 which is pinned to the shaft 192 to which the printing hammer 194 is also secured. The lever 266 has a cam slot 267 co-operating with a stud 268 carried by the control lever 215. When the control lever is moved forwardly from the position shown in Fig. 5 the lever 266, shaft 192 and hammer 194 will be rocked slightly to bring the stud 197 of the printing hammer 194 out of engagement with the operating portion 196 of the hammer operating arm. As a result of the control lever being in its "Off" position neither of the hammers will be operated to make an impression.

In order to permit the table 207 to be moved independently of the control lever to disable the consecutive number hammer by an operation of the "Charge" key there is provided a link 227 (Figs. 3, 4, 5 and 6) having a pin and slot connection to the arm 220, the pin carried by the latter being retained at one end of the slot in link 227 by a spring 2271. The link 227 is connected to an arm 228 fast to the right hand end of the shaft 93, which shaft as is seen from Fig. 3, carries a cam plate 230 engaging a stud 231 secured to the rear end of the "Charge" key 61. Whenever the key 61 is depressed and the control lever in its "On" position the stud on the key acting upon the cam plate will rock the link 227 and the arm 220 and through the connections previously described will shift the table 207 without effecting any movement of the control lever 215. The purpose of the pin and slot connection between link 227 and arm 220 is to permit the operation of a "Charge" key without moving the table 207, when the latter is already shifted by virtue of the control lever being at this time in its "Off" position and thereby permitting the machine to be operated without using the check or slip printing mechanism. It is also apparent that movement of the control lever from is "on" to "Off" position will not effect any movement of the link 227 or parts movable therewith. The table 207 carries suitable gripping devices for the check paper for preventing any accidental movement of the paper relative to the table and for insuring that the check paper will be moved simultaneously with the table. The purpose of this shifting movement of the check paper will be pointed out later.

*Detachable electro roller*

As previously stated the electro roller 234 has suitable type for printing the name, and address of the proprietor and other advertising matter. It is very desirable that new advertising matter be printed upon the checks from time to time and for this reason the present machine has a very simple device for permitting the electro to be easily detached and replaced by a new one. This device is shown in Fig. 12. On the disk 1841 which is attached to the frame 69 is mounted a stub shaft 258 and loosely mounted upon the shaft is a gear 259 for driving an electro roller 234. The gear 259 has a pin 260 co-operating with a slot formed in one end of the electro roller 234 so that movement of the gear 259 will be transmitted to the electro roller 234. A collar 1260 is mounted upon a shouldered portion of the shaft 258 so as to retain a spring-pressed plunger 261 which is freely movable in a recess 2612 in the end of shaft 258. To insert a new electro the roller is slipped over the shaft 258 until the notch in the roller co-operates with the pin 260 carried by the gear 259. At this time the plunger 261 will contact with a bevel edge 262 thereby preventing any accidental displacement of the electro roller and lock the same in place although permitting its free rotation on the shaft 258. The electro may be easily withdrawn from the shaft 258 by sliding it over the shaft thereby depressing the plunger 261 within the aperture formed in the collar 1260 and shaft 258. A shoulder on the pin 261 within the recess 2612 bears against the collar 1260 and prevents the plunger from falling out. For inking the electro there is provided an inking roller 263 (Figs. 4, 5, 6 and 8) journalled in a spring-pressed frame 264 which is pivoted upon a transverse shaft 265 carried by the upper portion of the right frame 69.

*Check issuing mechanism*

In most places of business, checks, or, as they are sometimes called, receipts, will be required in by far the larger number of transactions entered in the machine. When a check has been fully ejected by operation of a check lever 235 as will be explained it is torn from the strip, the forward edge 2301 of an aperture formed in a gripping plate 2311 (Figs. 8 and 10) pivoted at 232 to the table 207 serving as a satisfactory tearing edge. The next check to be issued will, therefore, have one end adjacent the tearing edge 2301 and will rest between a driving roller 233 and the electro roller 234 which has on its periphery type for printing any desired matter. In the present machine the type is designed to print the name and address of the proprietor and other advertising matter. The rollers 233 and 234 are geared together and are driven by a movement of the check feeding lever 235. As best shown in Fig. 2 the check lever 235 is pivoted exteriorly of the frame 21 and is connected by a link 236 (Fig. 5) to an arm 237, secured to a shaft 238 passing through the bushing 76. The other end of the shaft 238 has pinned thereto an arm 239 (Figs. 2, 3 and 4) connected by a link 240 to a segmental rack 241 loosely mounted upon the sleeve 79 which as previously stated is loose on the shaft 43. As shown in Fig. 11 the segmental rack 241 is in continuous mesh with a gear 243 attached to a clutch member 244 loose upon a shaft 245 journalled between the check printer frames 68 and 69. The clutch member 244 is provided with a diagonal notch 246 co-operating with a spring-pressed plunger 247 located in an aperture formed in a clutch member 248 pinned to the shaft 245. On the other side of the pinion 243 is a pinion 249 attached to the shaft 245 and in continuous mesh with a gear 250 secured to the feeding roller 233. (Fig. 8.)

When the check handle 235 is swung rearwardly the segmental rack 241 will rotate the gear 243 and through co-operation of the spring-pressed plunger 247 and the diagonal notch 246 will rotate the clutch member 248 and through the pinion 249 will effect a complete rotation of the rollers 233 and 234. The operation of the check feeding lever and rotation of the co-operating rollers will issue a check out of the machine where it may be detached and handed to the customer as a receipt. During the return movement of the check handle 235 no movement will be imparted to the clutch member 248 and co-operating rollers 233 and 234 since the diagonal notch 246 will merely cam the plunger away from the clutch member 244 without transmitting to the clutch member 248. In order to assist in the return of the check lever 235 to its normal position the arm 239 is provided with a downward extension 2501 (Fig. 4) to which is attached a spring 251. A disk 252 (Fig. 4) the periphery of which contacts with downward extensions 253 integral with the check lever 235 limits the reciprocating movement of the said lever. As is best shown in Figs. 8 and 11, the gear 249 is in mesh with the gear 145, which, it will be recalled, has suitable connections for operating the consecutive numbering device. In this manner each operation of the check handle will add a unit to the numbers already standing upon the consecutive number type carriers.

*Interlock between check lever and main shaft*

The check feeding lever 235 and shaft 36 are provided with co-acting means preventing operation of the keys when the feeding handle 235 is shifted from its normal or home position, and, which will, on the other hand, prevent movement of the feeding handle if a key has been partially depressed and the shaft 36 therefore given partial rotation. In the present embodiment this co-acting means consists of a rearward extension 254, (Figs. 4 and 20) integral with the segmental rack 241, and a disk 255 secured to the shaft 36. When the shaft is in its normal position, the position in which it is shown in the figures just mentioned, a cutaway portion 256 will be in the path of the extension 254. When the check handle 235 is operated the extension 254 will pass in front of the cutaway portion 256 thereby preventing the rotation of the shaft 36 by an operation of the keys. It is apparent that rotation of the shaft 36 and, of course, by an operation of the keys of the machine will be prevented until the feeding handle is returned far enough to carry the extension 254 out of the path of the portion 256 of the locking disk 255. It will also be evident that when the shaft 36 begins its rotation the periphery of the disk will be carried under the extension 254 thereby preventing any movement of the check handle 235 until the rotation of the shaft 36 is completed.

*Overthrow preventer*

Machines of this character are at times, subjected to improper usage by persons who desire them to work improperly, and in order to effect a misoperation of the machine they have operated the machine rapidly and with a considerable degree of force and violence. In rapid operations the sequence of events occur almost instantly and if considerable force were imparted to the check lever 235, the segmental rack 241 might impart such a rapid rotation to the electro as to cause it to overthrow with a result that incorrect printing would result during the next check issuing and printing operation. To preclude the possibility of overthrowing the electro and other parts the following mechanism is employed which is best shown in (Figs. 4, 11 and 20).

Secured to the transverse shaft 201, which as stated heretofore, is journalled between the side frames 68 and 69 is a locking arm 305 the upper end of which has connected to it a spring 1306. The locking arm 305 is provided with engaging ends 306, 307 which are adapted to engage notches 308 and 309 (Fig. 11) formed in members 310 and 311 respectively. The member 310 is rigid with gear 243 while the member 311 is pinned to shaft 245. As is seen in Figs. 4 and 20 the segmental rack 241 has a stud 1297 which co-operates with the upper edge of an arm 298 fast to the shaft 201.

When the check lever is drawn rearwardly the stud 1297 will cam the locking arm 298 downwardly bringing the engaging ends 306, 307 of the locking arm 305 against the periphery of the members 310, 311. At substantially the time the check lever is at its rearmost position the stud 1297 will engage a cam edge 312 and quickly depress the arm 298 forcing the engaging ends 306, 307 of the locking arm 305 into engagement with their respective notches 308, 309. Any attempt to rotate the electro beyond this position will be prevented by the straight edges of the notches 308, 309 engaging the edges of the engaging ends 306, 307 of the locking arm 305.

*Check gripping devices*

The illustrative embodiment is provided with devices for insuring a simultaneous movement of the check paper and check table. One of these devices normally acts upon the paper in such a manner that it keeps the check paper taut and prevents the check paper from becoming loose upon the roll. The other device exerts a pressure upon the paper so as to keep it against the table but this pressure is relieved during the issuing of the check by the check lever and at the completion of the feeding movement the device acts upon the paper so as to serve as a satisfactory tearing edge. The last two mentioned devices may be disabled at will so as to facilitate the insertion of a new supply of check paper.

The first mentioned device comprises a gripping plate 270 (Figs. 4 and 10) pivoted at 271 to downwardly extending lugs integral with the check table 207. Integral with the plate 270 is an arm 272 connected to a pitman 273 slidably mounted at its rearward end upon a rock shaft 274 passing through the frame 68. A coil spring 275 interposed between the pitman 273 and an arm 2751 integral with a finger piece 2761 normally tends to force the pitman 273 forward thereby rotating the pivoted gripping plate 270 (clockwise, Fig. 4) until its rearward horizontal edge contacts with the check paper 276 and holds it against the check table 207.

The gripping plate 2311 hereinbefore mentioned is pivoted at 232 (Figs. 5, 8 and 10) to the table 207 and has an aperture through which the paper is issued and is formed with a tearing edge 2301. As best shown in Fig. 10 the plate 2311 has attached to its underside a bracket 277 between which and the table 207 is a normally tensioned coil spring 278. The paper passes between the table 207 and through the aperture in the gripping plate 2311 which is forward of the tearing edge 2301. In order to lift the plate 2311 to relieve the pressure exerted upon the paper so that the check paper may be fed during a check issuing operation, the following mechanism is employed. The clutch member 248 is formed with a flat portion 279 (Figs. 6, 8, 11) normally contacting with the lower portion of an arm 280 secured to the shaft 274. The upper portion of the arm 280 contacts with the underside of the gripping plate 2311. The operation of the above mechanism is as follows: When the check lever 235 is drawn rearwardly to issue a check, the clutch member 248 will be immediately rotated and the lower portion of the arm 280 contacting with the periphery of the member 248 will elevate the gripping plate 2311 permitting the check to be fed outwardly. When the check lever is at its rearmost position the plate 2311 will be permitted to descend under the influence of the spring 278 (Fig. 10) and exert a pressure upon the check paper.

In addition to the above mentioned device for retaining the check paper against the table and preventing its lateral displacement there is provided a plate 281 (Fig. 10) attached by rivets to the forward portion of the check table 207. The separation between the plate 281 and the upper surface of the check table is sufficient to accommodate the thickness of the check strip. Attached to the side frame 69 is a transverse plate 282 upon which presses a plate 283 loosely attached by a rivet 284 to the frame 207. The weight of the plate 283 is depended upon for pressing the check paper against the transverse plate 282, but at times this plate may be moved upwardly to permit the end of a new supply of check paper to be passed between the plates 282 and 283.

As stated in the foregoing sections, devices are provided whereby the two gripping plates 270 and 2311 as well as the last mentioned plate 283 may be lifted upwardly at will to permit a new check strip to be manually inserted. In order to elevate the plate 283 there has been provided a downwardly extending lug 285 (Fig. 4) cooperating with a stud 286 attached to the pitman 273. The pitman 273 also carries a pin 287 co-operating with an arm 288 attached to the rock shaft 274.

In order to disable all of the gripping devices the gripping device 270 is lifted upwardly manually until the spring 275 draws a shoulder 289 of the manipulative device 2761 into locking engagement with a shoulder 2901, on the gripping plate 270. While the gripping plate 270 was being lifted upwardly the pin 286, co-operating with the lug 285, slightly elevated the plate 283. At the same time the pin 287 contacting with a cam edge on the arm 288 will rock the shaft 274 clockwise and by virtue of the engagement of the upper portion of the arm 280 with the gripping plate 2311 will lift the latter upwardly against the tension of the spring 278. Since all the gripping plates are lifted above the table and held in this position one end of the check strip may be easily inserted in the machine. At the completion of this movement the depression of the forward end 2761 of the manipulative device will permit the spring 275 to act again so all the gripping plates resume their normal positions and hold the paper firmly against the table 207.

*Alternating control of keys and check lever*

In addition to the mechanism described previously whereby the portion of the feeding handle 235 is prevented from being operated after the rotation shaft 36 has begun its movement, and vice versa, the machine has mechanism for controlling the sequence of operation of the operating keys and the check handle. This mechanism is best shown in Figs. 4, 7 and 20. In Figures 4 and 7 the parts are shown in the positions they occupy after an operation of the keys with the machine in check printing condition. At this stage the shaft 36 is held against rotation in the direction of the arrow (Fig. 4) by a shoulder 290 on a disk 291 which is attached to the shaft 36, engaging a lug 292 on an element 293 pivoted at 294 to the side of an arm 295 integral with the arm 298 which it will be recalled is fast upon the shaft 201. A spring 297 tends at all times to rock the element 293 in a clockwise direction about its supporting pivot 294 while the spring 1306 previously mentioned tends to rock the shaft 201 and connected parts in a counter-clockwise direction as viewed in Fig. 4. The disengagement of the lug 292 from the shoulder 290 is effected by rocking the arm 295 clockwise on its pivot 201 against the tension of the spring 1306 thereby swinging the lower end of the arm and the element 293 far enough to release the disk 291 and the shaft 36.

Movement of the arm 295 to perform this function is imparted during the rearward stroke of the check feeding handle 235. The means for effecting it comprises the arm 298 attached to the shaft 201 and the stud 1297 both of which have been referred to hereinbefore. When the rearward movement of the check lever 235 begins, the stud 1297 co-operating with the upper edge of the arm 298 will cam it downwardly and the arm 295 rearwardly a sufficient distance to disengage the lug 292 from the shoulder 290. When the lug and shoulder become disengaged the spring 297 will swing the element 293 until it is arrested by the engagement of a lug 299 thereon with a shoulder 300 on the arm 295. In this position the locking lug 292 will rest upon the periphery of the disk 291 thereby holding the arm 295 in such position that it will not interfere with the rotation of the disk and the shaft 36 (see Fig. 20).

After the feeding handle 235 has been given a full to and fro movement to effect the issuance of a check, the shaft 36 is released for rotation, and the keys may be depressed to register the next item. During this registration the shaft 36 will be given its usual complete rotation. Near the end of the rotation of the shaft the shoulder 290 will engage the locking lug 292 and swing the element counter-clockwise to the position in which it is shown in Fig. 4. Movement beyond this position is prevented by engagement of the locking lug 292 with a shoulder 301 integral with the arm 295.

The interlocking mechanism just referred to is so constructed that after it has been disabled to free the keys for an operation it will prevent a second operation of the check feeding mechanism without an intervening operation of the keyboard. Loosely mounted upon the shaft 201 is a lever 315 (Figs. 4, 7, and 20) provided with a hook and notched portion 316 and a rearward projection 317 contacting with a stud 318 carried by the arm 295, the spring 297 forcing the projection against the stud 318. When the check lever is drawn rearwardly the arm 295 as previously stated will also be moved in unison with the arm 298 being integral therewith. As the check lever returns, the arm 295 will be held in its rearward position (Fig. 20) as previously stated, and the stud 1297 will bear against the lower edge of the lever 315. When the check lever returns to its home or normal position the hook or notched portion 316 of the lever 315 will drop over the stud 1297 on the check lever thereby preventing a second operation of the lever. When the keys are subsequently operated the stud 318 contacting with the projection 317 will raise the lever 315 to disengage the hook from the stud thereby freeing the check lever (see Fig. 4).

Slip printing control

When printing upon inserted slips it is necessary to set the control lever to its "On" position and depress the "Charge" key with the amount keys. During this time certain mechanism comes into play so that the interlocking mechanism controlling the sequence of operation of the keys and the check lever does not go into operation and is retained in its ineffective position. The result of this is that whenever the "Charge" key is operated to print upon the slips it will be possible to subsequently operate the keys without necessitating an actuation of the check lever, and in fact, the lever is completely locked so that it cannot be manipulated until the keys are again operated under conditions requiring a check to be issued.

This mechanism comprises an arm 325 (Figs. 7 and 20) contacting with a pin 326 carried by the disk 291 fast to the shaft 36. The arm 325 is secured to a sleeve 327 loose on the shaft 93 which sleeve carries at its other end a two armed member 328, 329. A spring 330 interposed between the arm 325 and the fixed frame 23 tends to rotate the sleeve in a counter-clockwise direction, (as viewed in Fig. 20) its rotation being stopped by the arm 328 contacting with a stud 331 carried by an arm 332 integral with the arm 228 which as hereinbefore mentioned is fast on the shaft 93.

When the "Charge" key is depressed the rotation shaft 36 will be rotated and by virtue of the stud 231 on the rear end of the said key operating the cam portion in the cam plate 230 (Fig. 3) the shaft 93 will be rocked clockwise. During this time the stud 331 carried by the arm 332 (Fig. 20) fast to the shaft 93 will depress the arm 328 and also rotate the sleeve 327 and arm 325 clockwise, the latter being permitted since a partial rotation of the shaft 36 will draw the pin 326 away from the end of the arm 325. During the time that the arm 325 drops down the arm 329 which is movable therewith rocks clockwise (Fig. 20) until a lug 333 thereon moves under a projection 334 of the locking arm 305. The result of this is that the holding of the locking arm 305 and shaft 201 will keep the element 293 away from the disk 291 and prevent the lug 292 from engaging the shoulder 290 to lock the shaft and keys. During the final movement of the keys the pin 326 striking the arm 325 will restore the parts to their normal position shown in Fig. 20, the shaft and keys being free to be subsequently operated. It will be understood that the raising of arm 325 will not take place until the solid portion of disk 291 again comes opposite the lug 292. It will also be evident that the check lever will not only be locked against operation but will be retained locked until the keys are operated without a depression of the "Charge" key.

When some operation other than a charge transaction follows the arms 325 will not drop downwardly but will be held upwardly by the spring 330 its movement being limited by the arm 328 contacting with the stud 331 on the arm 332 which is moved only when a "Charge" key is operated. As the disk 291 rotates the spring 1306 will permit the lug 292 on the element 293 to co-operate with the shoulder 290 since there is no means to hold the locking arm 305 forward as in the case when a "Charge" key is depressed. The parts will now assume the position shown in Fig. 4, the keys being locked and the check lever released to permit the issuing of a check relating to the transaction just completed.

*Special control lever*

At certain times it may be desirable to use the registering keys without using the "Charge" key and without being compelled to operate the check feeding handle 235. It is necessary, therefore, to be able to disengage the locking lug 292 from the shoulder 290 and hold these parts disengaged whenever printing upon checks or an inserted sales slip is to be discontinued. This is effected by moving the control lever 215 from the position designated as "On" to the position designated as "Off". The mechanism for doing this is shown in Figs. 4 and 8 and includes an arm 360 loosely pivoted on the shaft 192 between the right hand end of the hub of the printing hammer 194 and the side frame 69 (Fig. 6) and is apertured to receive a stud 361 secured to the arm 219, which, as previously pointed out, has connections to the check table for moving the latter. The lower end of the arm 360 carries a stud 363 bearing against the upper end of the locking arm 305. Movement of the controlling lever 215 from the "On" position shown in Fig. 4 to the "Off" position will result in moving the arm 360 forwardly and by means of the stud 361 will rock the locking arm 305 and shaft 201 clockwise as viewed in Fig. 4, and carry the locking lug 292 away from the shoulder 290. It is clear, therefore, that with the controlling lever 215 set at its "Off" position the keys and the rotation shaft 36 driven thereby are all free for operation without it being necessary to manipulate the check feeding lever 235. It will also be apparent from the above that when the arm 305 is rocked clockwise the engaging ends 306 and 307 thereon will enter their related notches formed in the members 310 and 311. Furthermore, since the pin 318 is shifted away from the shoulder 317 the hook 316 will drop over the stud 297 and the result of the above is that the check lever and associated train of mechanism will be effectively locked at two points against any manipulation whenever the check printing is discontinued.

It will also be recalled that whenever the control lever is in its "Off" position the amount and identifying character printing hammer 194, as well as the consecutive number printing hammer 191, are held so that neither of these hammers will be operated to print upon the check paper.

*Slip printing control of check table*

When the machine is to be used to print upon a sales slip it is necessary to operate the "Charge" key. This insures locking the check feeding handle 235, disabling the consecutive number printing hammer and the inter-locking mechanism. The sales slips are inserted in a slot 365 (Fig. 3) far enough to bring them between the type carriers and impression hammer so that the portion of the slip upon which the impression should fall is properly positioned.

When the "Charge" key is operated with the controlling lever 215 is in its "On" position the check paper table is given the movement above described to draw the check paper back from between the rollers 233 and 234. As will be seen in Fig. 8 the rollers are cut away so that at their normal positions this movement of the paper is permitted. It will also be recalled that gripping plates act upon the paper in such a manner that the check paper will move at all times with the table. The purpose of so moving or shifting the check paper is to afford a means whereby if the "Charge" key of the machine should be operated with the controlling lever 215 at the "On" position and without a slip having been inserted, the resulting impression will be made on the check at a point where it will be covered up or obliterated by a subsequent impression from the type on the roller 234. The way in which such an incorrect impression is overprinted is illustrated in Fig. 14 by parallel lines indicated by reference character 1266.

In order to more clearly illustrate how the present machine accomplishes this, a brief example will be given. In Fig. 13 there will be seen a check which represents a "cash" transaction by clerk "A" on October 23rd, for $5.20, the serial number of this check being 162. If, now, a "charge" transaction for $2.00 should be entered in the machine by the "A" clerk the keys representing this amount are depressed in conjunction with the "Charge" key and the key designated clerk "A". Since the "charge" transactions are usually identified with slip printing, a slip should be inserted in the slot 365 provided for this purpose. It will be assumed that the clerk has inadvertently neglected to insert the slip and has operated the machine with the controlling lever in its "On" position and has depressed the above designated keys. During the downward movement of the "Charge" key the check paper will be reversely moved to a position bringing the printing line some distance higher up on the check than during a normal "cash" operation. On the return of the "Charge" key, however, the check will be restored to normal position where the old printing line is again established. It will be understood that the hammer 194 will be operated to take its impression while the check is in its shifted position.

If now clerk "B" enters a cash transaction for $2.50 and wishes a check he will leave the controlling lever in its "On" position and then depress the proper operating keys. Since two amounts will now appear upon the check confusion would result, and it is therefore desirable to cancel or delete the record of the previous "charge" transaction which should have been printed upon the slip. The type of the electro are so positioned that upon a subsequent rotation of the roller 234 the electrotype carried thereby will over-print or cover the impression made upon the check during the previous transaction. At the same time the identifying characters, amount, date and consecutive number of the present transaction will appear in the correct space on the issued check as shown in Fig. 14. This figure also shows at 1266 the way in which such an incorrect transaction is over-printed and obliterated. The type which over-prints the incorrect transaction is merely illustrative and the size and configuration of the type may, if desired, be changed in any manner so that an impression from them will dominate and substantially conceal the impression from the other type.

Removal of check printing unit

As stated hereinbefore the check and slip printing mechanism is designed as a unitary structure to facilitate its assembly and its removal from its associated registering mechanism in the event of repairs and adjustment. In order to disconnect the check printing mechanism from the machine all that is necessary is to disconnect the link 227 and spring 2271 from the arm 220 and withdraw the screw 70 and lift the unit out of the machine, but before this is possible, however, it is necessary to place the controlling lever, 215 in a certain position, and when in this position certain locking mechanism becomes effective. It will be evident that if the printing mechanism were detached from the machine and no provision were made to lock the electro and associated train of mechanism the timing relation between these and the driving rack 241 would be altered. It is also evident that when the pinions connected to the various type carriers are withdrawn from their associated driving racks, the type carriers and pinions might be accidentally and freely rotated making it necessary to set all the type carriers to bring their type to their proper position before meshing the racks with the pinions when the check printing mechanism is subsequently inserted in the machine, if no suitable means were provided to prevent such displacement.

For this reason some suitable locking mechanism is provided for locking the electro 234 and all the amount and identifying type carriers in their normal position when the printing mechanism is detached from the machine. If the screw 70 is removed and an attempt made to remove the printing mechanism without adjusting the controlling lever to its "On" position, a projection 366, (Fig. 8) integral with the arm 360 will strike an abutment 367 of the ear 71 on the rear frame 23. It will therefore be impossible to remove the printing mechanism until these two elements are disengaged, this being effected by moving the control lever 215 from its "On" to its "Off" position since during this time the stud 361 will draw the arm 360 forwardly to disengage the projection 366 from the abutment 367. When the controlling lever 215 is set to its "Off" position, the engaging ends 306 and 307 of the locking arm will engage their related notches 308 and 309 formed in members 310, and 311 and will, of course lock the electro and associated driving mechanism against any accidental rotation. It will also be evident, as has been described before, that when the controlling lever 215 is set to its "Off" position the two printing hammers will be locked against movement thereby preventing the rubber impression blocks from contacting with the inked ribbon and prevent soiling the underside of the check paper upon a subsequent printing operation.

In order to hold the identifying and amount printing type locked in their normal position when the check printing mechanism is removed there is provided a spring 368 attached to the operating slide 173 (Fig. 5) and tending at all times to draw the stud 190 thereon against the lower end of the arm 188. When the check printing mechanism is removed and the roller 175 disengaged from its related cam 176, the spring 368 will become effective to draw the operating slide 173 downwardly and through the arm 188 and associated train of mechanism bring the aligning pawls 180 into the interdental spaces of the pinions movable with their respective type carriers.

*Lid control devices*

The cabinet 25 of the machine is provided with a flat lid 375 (Fig. 1—A) hinged at 376 (Fig. 3). The flat lid has attached thereto by means of rivets and other securing means a hood 377 of a box formation adapted to conceal the check and the slip printing mechanism. The hood 377 extends forwardly and downwardly to provide a cover for the check paper roll, the roll resting upon a curved flange plate 370 (Fig. 3) riveted to the cabinet 25. The left side of the check paper hood has an opening 380 so that the amount of check paper in the machine can readily be determined.

It is essential, of course, that locks be provided for locking the various lids so that only the authorized persons can obtain access to the different mechanisms. It is desirable, furthermore, to permit the clerk to have access to the different paper supply devices so that when the supply of paper has been exhausted it may be replenished at will. To this end there is provided a lock 381 carried by a hinged cover 382 the bolt of this lock operating upon an arm 383 attached to a shaft 384 journalled in the side plates of the cover 382. The flat lid 375 and therefore the check printer hood 377 is locked by means of a hook 385 attached to the shaft 384 and engaging the flange of a stud 386 carried by the lid 375. When the clerk desires to obtain access to the paper supply devices of both record strip and check printing mechanism he operates the bolt of the lock 381 thereby rocking the shaft 384 sufficiently to disengage the hook 385 from the flange of the stud 386. By the means just described the clerk may have access to the check printing and record strip printing paper supply mechanisms. In the replacing of a new supply of paper the check roll is placed upon the curved plate 370 and one end of the check strip may be inserted and drawn over the table 207 and it is apparent, of course, that before this can be done the various gripping plates must be disabled by the means hereinbefore explained.

As explained fully in the application to Frederick L. Fuller, Ser. No. 263,125 and the British patents hereinbefore mentioned the lower hinged cover 382, when opened, gives access to the total printing and totalizer clearing mechanisms and it is quite desirable that while the clerk may have access to the paper supply devices he should not be able to unlock the cover 382 to have access to these mechanisms. To this end the hinged cover 382 is locked by means of a catch 387 engaging a lug 388 integral with a plate 389 carried by the check printer side frame 68. It will be noted that the hook 385 for locking the lid 375 is shorter than the hook 387 adapted to lock the lid 382. The result of this is that while the clerk may, through the operation of the bolt of the lock 381, disengage the hook 385 from the flange of the stud 386 to unlock the lid 375 he cannot rock the shaft 384 sufficiently to entirely disengage the hook 387 from the lug 388 to unlock the cover 382. As explained fully in the application Ser. No. 263,125 and the British patents referred to, there is provided a supplemental lock 390 (Fig. 1—A) which has certain connections to the shaft 384 so that it may be rocked sufficiently to unlock both the lid 375 and the cover 382. The key of this lock is usually retained by the proprietor or some other authorized person who generally has access to the total printing and clearing mechanisms.

In describing the construction of the improved machine it has been necessary incidentally to describe the operation of the various features to such an extent that it is thought that the usual summary of the operation of the machine may be omitted.

While the embodiment herein shown and described is well adapted to fulfill the objects above stated, it is not the intention to limit the invention to the one illustrative form, as it is capable of various modifications and changes all coming within the scope of the claims which follow:

What is claimed is:

1. In a machine of the class described, the combination with differentially adjustable type carriers, manipulative devices, means controlled by the manipulative devices for adjusting the type carriers and taking impressions therefrom, manually operable means for feeding record material adapted to receive said impressions, interlocking devices for controlling the sequence of operations between the manipulative devices and the manually operable means, a special key, and means under control of the special key for preventing the interlocking devices from becoming effective.

2. In a cash register, the combination with a printing mechanism for printing upon inserted slips or checks, keys including a special key for adjusting type carriers to print different data upon the checks or slips, a manually operable check issuing device, interlocking devices between the said keys and the check issuing devices controlling the sequence of operations thereof, and means for preventing the interlocking devices from becoming effective when the special key is operated in conjunction with the other keys.

3. In a cash register, the combination with a check and slip printing mechanism, means for printing upon checks and a manipulative device for issuing them after printing, a special key operated when it is desired to print upon a slip, and means under control of the said key for locking the manipulative device during and after an operation of the special key.

4. In a cash register, the combination with a check and slip printing mechanism, manipulative devices for adjusting type carriers for printing upon checks, a manually operable device for feeding the checks, interlocking devices controlling the sequence of operation between the manipulative devices and the manually operable device, a special key, means controlled by the said key for rendering the interlocking devices ineffective, and a separably operable device for enabling and disabling said interlocking devices.

5. In a machine of the class described, the combination with a printing mechanism for printing upon issued checks or slips inserted in the mechanism, of devices for preparing the mechanism for printing upon inserted slips or issued checks, a special key for preparing the mechanism for printing upon inserted slips and devices controlled by the special key for preventing the issue of a check after the special key has been operated to print upon an inserted slip.

6. In a machine of the class described, the combination with a plurality of keys, printing mechanism controlled by the keys for printing upon issued checks or slips inserted in the mechanism, a manually operable device for issuing checks, an adjustable lever for preparing the mechanism for printing upon inserted slips or issued checks, a special key for preparing the mechanism for printing upon inserted slips, an interlocking mechanism for controlling the sequence of operation between the keys and the manually operable device, and connections from the special key and the adjustable lever for disabling the interlocking devices.

7. In a machine of the class described, the combination with a set of type carriers for printing upon inserted slips or issued checks, consecutive number type carriers, separate impression members for the consecutive number type carriers and the first mentioned type carriers, means for normally operating both of said impression members upon an operation of the machine, a special key operated when printing upon a slip is effected, and means under control of the special key for preventing the impression member related to the consecutive number type carrier from operating without interfering with the operation of the other impression member.

8. In a machine of the class described, a set of amount and identifying printing type carriers, consecutive number type carriers, impression devices comprising separate impression members for the consecutive number type carriers and the remaining type carriers, an invariably moved member for actuating the impression members and a special key having connections to the consecutive number impression member for moving it toward the type carriers and out of contact with its operating member without disturbing the operative condition of the other impression member.

9. In a machine of the class described, a plurality of sets of type carriers including a set of consecutive number type carriers, separate impression members for each set of type carriers, a common operating member for the impression members, a movable check table, means on the check table for moving the consecutive number impression member towards the type carriers and out of contact with the operating member without disturbing the other of the plurality of impression members, a special key, and connections whereby the special key moves the table.

10. In a machine of the class described, a plurality of sets of type carriers including a set of consecutive number type carriers, separate impression members for each set of type carriers, a common operating member for the impression members, a movable check table, a cam on the check table for moving the consecutive number impression member towards the type carriers and out of contact with the operating member without disturbing the remainder of the impression members, a special key, and connections whereby the special key moves the check table.

11. In a machine of the class described, sets of type carriers including a set of consecutive number type carriers for printing different data upon the record material, manipulative devices for adjusting one of said sets of type carriers, separate impression members for each set of type carriers, a common operating member for the impression members, a movable check table, a cam on the check table for holding the consecutive number impression member away from the operating member without disturbing the other of said impression members, and connections whereby one of the manipulative devices moves the table.

12. In a machine of the class described, the combination with item entering mechanism, of manually operable check strip feeding mechanism, devices operated by the item entering mechanism for printing upon the check strip, interlocking mechanism normally requiring alternate operations of the item entering mechanism and the check feeding mechanism, a special key, and connections whereby the special key controls the interlocking mechanism.

13. In a machine of the class described, the combination with item entering mechanism, of manually operable check strip feeding mechanism, devices operated by the item entering mechanism for printing upon the check strip, interlocking mechanism requiring alternate operations of the item entering mechanism and the check feeding mechanism, a lever, a special key, and connections whereby both the lever and the special key control the interlocking mechanism.

14. In a machine of the class described, the combination with item entering mechanism, of a manually operable check strip feeding mechanism, devices operated by the item entering mechanism for printing upon the check strip, interlocking mechanism requiring alternate operations of the item entering mechanism and the check feeding mechanism, a lever adjustable to two positions for either locking the manually operable mechanism or unlocking it and rendering the interlocking mechanism effective, a special key, and connections whereby the special key renders the interlocking mechanism ineffective and locks the manually operable mechanism.

15. In a cash register, the combination with a plurality of printing elements, means for adjusting them to print different data upon record material, a hammer for causing an impression to be made upon the record material from the printing elements, supporting means for the printing elements and hammer structurally separate and detachable from the register, means for locking said hammer and printing elements against operation, and means for preventing the removal of the supporting means unless the hammer and printing elements are locked against operation.

16. In a cash register, the combination with a plurality of printing elements, a printing hammer for taking impressions from said elements upon record material, means for adjusting said elements to print different data upon record material, a lever for permitting or preventing printing upon the record material, supporting means for the printing elements and hammer structurally separate and detachable from the register, and means operatively connected to said lever for preventing the removal of the supporting means unless said lever is set to a position wherein printing is prevented.

17. In a cash register, the combination with a printing mechanism, detachable from the register, elements for printing different data upon a record strip carried by the printing mechanism, aligning pawls for locking the printing elements, and means automatically set in operation upon detaching said printing mechanism for operating the aligning pawls.

18. In a cash register, the combination with a printing mechanism detachable from the register, elements for printing different data upon record material carried by the printing mechanism, aligning pawls for locking the printing elements, and a spring for automatically operating the aligning pawls to lock the printing elements as the printing mechanism is detached from the register.

19. The combination with a check printing mechanism, manually operable check issuing devices, interlocking mechanism for compelling alternate operation of the check printing and check issuing devices, a plurality of manipulative devices, and means controlled by either of the latter for disabling the interlocking mechanism.

20. The combination with a recording mechanism for printing characters upon a check contained in the machine, and a check issuing device alternately operated, of locking devices for each mechanism each locked by the operation of its respective mechanism and unlocked by the operation of the other mechanism, a manipulative device operated when it is desired to print upon other material than issued checks, said device being restored to normal upon each operation of the machine and means controlled by said manipulative device for disabling one of the locking devices.

21. In a cash register, the combination with a check table, a plurality of devices for pressing the check paper against the surface of the table, and means for disabling one of the devices while another of said devices remains effective.

22. In a cash register, the combination with a check table, a spring operated device for pressing check paper against the surface of the table said device being located at an extreme end of the check table, and said device being apertured for the passage of the check paper and serving as a tearing edge.

23. In a cash register, the combination with a check table, a plurality of spring operated devices for simultaneously pressing the check paper against the surface of the table, one of said devices being always effective during the normal operation of the register, and a manipulative device for disabling the remaining device while the first mentioned device remains active.

24. In a cash register, the combination with a check table, a check issuing mechanism, a plurality of spring operated devices for urging check paper against the surface of the table, means for disabling one of said devices during an operation of the check issuing mechanism while the other remains operative, and a manipulative device for simultaneously disabling all the spring operated devices.

25. In a cash register, the combination with a check table, a check issuing mechanism, a plurality of spring operated devices for urging the check paper against the surface of the table, means for disabling one of said devices during an operation of the check issuing mechanism, a manipulative device for simultaneously disabling all the spring operated devices, and means for holding them disabled.

26. In a cash register, the combination with a movable check table, a spring operated device for urging check paper against the check table, a cam for disabling said device, a manipulative check feeding device, and connections from the latter to said cam.

27. In a cash register, the combination with a check table, a device for urging check paper against the surface of the table, a manipulative device for rendering said first mentioned device ineffective, and tensioned means for operating the first mentioned device and holding the manipulative device in its operated position.

28. In a cash register, the combination with a check table, a plurality of spring operated devices for urging check paper against the surface of the table, a cam for disabling one of the devices, manipulative means for moving the remaining devices to ineffective position, a link connected to the manipulative device and a stud on said link for operating said cam.

29. In a cash register, the combination with a check table, a check issuing mechanism, a plurality of spring operated devices for urging check paper against the table, manipulative means for disabling all the devices when a new supply of check paper is inserted in the register, and means for disabling one device independently of the others when the check issuing mechanism is operated.

30. In a cash register, the combination with an operating mechanism, an endless inking ribbon, a support carrying a plurality of rollers around which the ribbon is passed, an inking roller carried by the support and contacting with the ribbon, a device carried by the support for placing a tension upon the ribbon, a ratchet wheel secured to the roller, and a pawl in engagement with the ratchet wheel having connections to the main operating mechanism for feeding the roller and ribbon an increment, said support and mechanism carried thereby being readily detachable as a unit from the register.

31. In a machine of the class described a main operating member, a check issuing lever, interlocking connections between said member and lever normally preventing operation of the lever, said connections being normally adapted to release the lever for operation upon an operation of the member, and manually controlled means operatively connected with said member to prevent the release of said lever on an operation of the member.

32. In a machine of the class described a plurality of sets of type carriers, a plurality of impression hammers each associated with a set of type carriers, operating means for said hammers, manipulative means, means actuated by said manipulative means for setting a type carrier in one set, and additional means actuated by said manipulative means for simultaneously disabling the impression hammer associated with another set.

33. In a machine of the class described a plurality of sets of type carriers, a plurality of impression hammers each associated with a set of type carriers, operating means for said hammers, manipulative means, means actuated by said manipulative means for setting a type carrier in one set, additional means actuated by said manipulative means for simultaneously disabling the impression hammer associated with another set and separate manual means for disabling all of said impression hammers when desired.

34. In a machine of the class described a series of operating keys, a check issuing lever, a latch normally preventing movement of said lever, an arm automatically controlled by operation of the machine for determining the effectivity of said latch, and a special transaction key and connections active during an operation of the machine to prevent the release of said latch.

35. In a machine of the class described, a main operating mechanism, keys for operating the same, manual check issuing means, interlocking devices to prevent simultaneous operation of said operating mechanism and said manual means, devices adapted to compel sequential operation of said operating mechanism and said manual means and a plurality of manipulative elements each being operable to disable said last mentioned devices.

36. In a machine of the class described in combination with the main operating structure, a separable printing unit adapted for operative connection with the main operating structure, a series of type elements movably mounted in said unit, impression means movably mounted in said unit, a lever carried by said unit and adapted in one of its positions to lock said impression means against movement, means preventing removal of the unit until the lever is shifted to such position, and means operative upon removal of the unit to lock said type elements against movement.

37. In a machine of the class described a main frame structure, a printing unit detachable from said frame structure, adjustable printing elements carried by said unit, means for preventing adjustment of said elements, and connections automatically operable upon detachment of said unit for operating said means to prevent adjustment of said elements.

38. In a machine of the class described including a frame structure, a plate detachably mounted on said frame structure, an inking ribbon carried by said plate, and a readily accessible lever for controlling the detachment of said plate from said frame structure.

39. In a machine of the class described, a movable check table, type carriers, means for effecting impressions from said type carriers upon check material carried by said table, and means on said table for disabling said impression means.

40. In a cash register, the combination with a printing mechanism detachable from the register, elements for printing data upon record material carried by the printing mechanism, aligning pawls for locking the printing elements, connections for actuating said pawls as an incident to operation of the register, and means cooperating with said connections for operating said pawls upon detachment of the printing mechanism from the register.

41. In a cash register, the combination with a printing mechanism detachable from the register, elements for printing data upon record material carried by the printing mechanism, aligning pawls for locking the printing elements, an operating member for said pawls, and a spring connected to said member for effecting actuation of said pawls as an incident to removal of the printing mechanism from the register.

42. The combination with a check printing mechanism, including a plurality of impression devices, manually operable check issuing means, interlocking mechanism for compelling alternate operation of the check printing mechanism and the check issuing means, a special key and means controlled thereby for disabling the interlocking mechanism and rendering one of said impression devices ineffective.

43. The combination with a check printing mechanism, including a plurality of impression devices, manually operable check issuing means, interlocking mechanism for compelling alternate operation of the check printing mechanism and the check issuing means, a special key, means controlled thereby for disabling the interlocking mechanism and rendering one of said impression devices ineffective, and a manipulative member for causing said plurality of impression devices to be rendered ineffective.

44. In a cash register, the combination with a movable check table, a check strip supported thereby, means for moving said table during an operation of the machine, a plurality of gripping devices for insuring the simultaneous movement of the check strip and table, and means for disabling one of the gripping devices while the other remains operative.

45. In a cash register, the combination with a check table, a plurality of devices for simultaneously pressing the check paper against the surface of the table, check issuing means, and means whereby when the check issuing means is operated one of said devices will be disabled while the other remains operative.

46. In a cash register, the combination of a readily detachable printing unit comprising supporting means, printing elements and impression means supported by said supporting means, a normally effective means for preventing separation of the printing unit from the main register mechanism, and a lever having connections to the normally effective means to operate the same to effective and ineffective positions.

47. In a cash register, the combination with a frame, a printing mechanism comprising printing elements and impression means, said printing mechanism being structurally separate and readily detachable from said frame, a projection mounted on said printing mechanism normally under an abutment carried by the frame for preventing removal of the printing mechanism and a lever for disengaging the projection from the abutment.

In witness whereof I have signed my name hereto this 27th day of May, 1925.

WALTER E. LIPPERT.